United States Patent
Kawashiri

(10) Patent No.: US 8,312,955 B2
(45) Date of Patent: Nov. 20, 2012

(54) WORKING VEHICLE WITH CABIN

(75) Inventor: Shinya Kawashiri, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 0 days.

(21) Appl. No.: 13/144,595

(22) PCT Filed: Jan. 5, 2010

(86) PCT No.: PCT/JP2010/050022
§ 371 (c)(1),
(2), (4) Date: Jul. 14, 2011

(87) PCT Pub. No.: WO2010/082511
PCT Pub. Date: Jul. 22, 2010

(65) Prior Publication Data
US 2011/0272966 A1      Nov. 10, 2011

(30) Foreign Application Priority Data
Jan. 14, 2009   (JP) ................................. 2009-005546

(51) Int. Cl.
*B62D 21/00*      (2006.01)
(52) U.S. Cl. ........ 180/312; 180/346; 180/352; 180/354; 180/377
(58) Field of Classification Search ................... 180/312, 180/336, 337, 352, 346, 354, 377
See application file for complete search history.

(56) References Cited

U.S. PATENT DOCUMENTS

| | | | |
|---|---|---|---|
| 6,752,228 B2 * | 6/2004 | Aoyama et al. | 180/89.12 |
| 6,758,301 B2 * | 7/2004 | Shiba et al. | 180/383 |
| 6,935,457 B2 * | 8/2005 | Tsuda | 180/312 |
| 7,111,705 B2 * | 9/2006 | Ohta et al. | 180/312 |
| 7,832,519 B2 * | 11/2010 | Sakamoto et al. | 180/312 |
| 7,900,737 B2 * | 3/2011 | Isogai | 180/305 |
| 8,157,042 B2 * | 4/2012 | Fujiki | 180/89.12 |
| 8,186,474 B2 * | 5/2012 | Shioji et al. | 180/312 |

FOREIGN PATENT DOCUMENTS

| | | |
|---|---|---|
| JP | H10-218014 | 8/1998 |
| JP | 2002-59761 A | 2/2002 |
| JP | 2007-290705 A | 11/2007 |
| JP | 2008-87491 A | 4/2008 |
| JP | 2008-105539 A | 5/2008 |

OTHER PUBLICATIONS

English Translation of Written Opinion of the International Searching Authority for PCT/JP2010/050022, dated Aug. 25, 2011, 5 pages.
International Search Report for International Application No. PCT/JP2010/050022 mailed Apr. 6, 2010, 4 pgs.

* cited by examiner

*Primary Examiner* — Toan To
(74) *Attorney, Agent, or Firm* — Sterne, Kessler, Goldstein & Fox P.L.L.C.

(57) ABSTRACT

A working vehicle according to the present invention includes a pair of front frames and a pair of main frames that are detachably connected to each other, a reinforcing member coupling the pair of main frames while being overlapped therewith in a side view, a pair of attachment stays fixedly attached to outer side surfaces of the pair of main frames so as to be at least partially overlapped with the reinforcing member in a side view. A cabin is supported in a vibration-isolation manner at no less than four positions including the pair of attachment stays and right and left supporting positions that are provided at a pair of rear axle cases or a transmission case. The working vehicle can enhance stabilization of support of the cabin while simplifying a structure.

5 Claims, 21 Drawing Sheets

WORKING VEHICLE WITH CABIN

FIELD OF THE INVENTION

The present invention relates to a working vehicle with cabin.

BACKGROUND ART

In working vehicles, rotational power from an engine is changed in speed at a transmission and is then transmitted to a pair of front wheels or a pair of rear wheels, which function as driving wheels. Among them, working vehicles each including a cabin that surrounds a driver's seat have been conventionally used as a tractor and the like.

However, such a conventional working vehicle provided with a cabin has possibility for improvement in view of stably supporting the heavy cabin in a vibration-isolation manner.

For example, in a conventional working vehicle provided with a cabin, a pair of front plates, a pair of cabin brackets, and four brackets for a transmission case at front, rear, right, and left positions are fixedly attached to front portions, intermediate portions, and rear portions of a pair of right and left main frames, respectively. The cabin is supported by the front plates and the cabin brackets in a vibration-isolation manner, and the transmission case is supported by the brackets for the transmission case (see Patent Document 1 which is mentioned below).

More specifically, in the conventional working vehicle provided with a cabin, the pair of main frames are coupled to each other at the front portions and the intermediate portions by a front link frame and a coupling frame for a working device coupler, respectively.

The front plates each have an outer end coupled to the corresponding main frame and a rear end coupled to the front link frame. The cabin brackets each have an outer end coupled to the corresponding main frame at a position immediately behind the coupling frame As described above, in the conventional working vehicle provided with a cabin, the rear ends of the front plates are coupled to the front link frame, and the cabin brackets are disposed immediately behind the coupling frame, so as to increase the rigidity at the support points at which the cabin is supported. However, all of the four cabin support points at the front, rear, right, and left positions are located on the pair of main frames. Accordingly, it is not possible to realize an enough stable support for the cabin.

PRIOR ART DOCUMENT

Patent Document
Patent document 1: Japanese Unexamined Patent Publication No. H10-218014

DISCLOSURE OF THE INVENTION

The present invention has been achieved in view of this problem of the conventional art, and it is an object thereof to provide a working vehicle with cabin, in which rotational power from an engine is changed in speed by a transmission including a transmission case and is then transmitted to a pair of front wheels or a pair of rear wheels, which function as driving wheels, the working vehicle capable of realizing stabilization of support of the cabin with a simple structure.

In order to achieve the object, the present invention provides a working vehicle with cabin configured so that rotational power from an engine is changed in speed by a transmission including a transmission case and then is transmitted to a pair of front wheels and/or a pair of rear wheels, which function as driving wheels, wherein the transmission case having right and left side walls to which a pair of rear axle cases are coupled is disposed rearward at a distance from the engine, the pair of rear axle cases accommodating a pair of rear axles that are coupled to the pair of rear wheels, wherein there are provided a pair of right and left front frames that are disposed on a front side of the vehicle and support a front axle case accommodating a front axle coupled to the front wheels, wherein there are provided a pair of right and left main frames that couple to the pair of front frames with the right and left side walls of the transmission case, respectively, wherein a reinforcing member and a pair of attachment stays are provided, the reinforcing member coupling the pair of main frames with each other in a state of being overlapped with the pair of main frames in a side view, the pair of attachment stays being fixedly attached to the outer side surfaces of the pair of main frames so as to be at least partially overlapped with the reinforcing member in a side view, and wherein the cabin is supported in a vibration-isolation manner at no less than four positions including the pair of attachment stays, and right and left supporting positions are provided at the pair of rear axle cases or the transmission case.

The working vehicle according to the present invention makes it possible to improve the balance between the front and rear portions of the working vehicle 1, since the engine and the front axle case are disposed closer to the front side and the transmission is disposed closer to the rear side in the vehicle longitudinal direction. Further, since the cabin is supported in a vibration-isolation manner by highly rigid sites of the pair of main frames that are coupled with each other by the reinforcing member, and also by the transmission case or the rear axle cases, the configuration makes it also possible to enhance stabilization of support of the cabin, thereby realizing a desired antivibration effect for the cabin.

In a preferable configuration, the working vehicle with cabin may further include a bridge frame having a pair of side plate portions and a coupling plate portion. The pair of side plate portions have lower ends coupled to the right and left ends of the reinforcing member and upper ends extending upward. The coupling plate portion couples the upper ends of the pair of side plate portions with each other and is connected via an antivibration mechanism to an engine mounting flange provided at the rear end surface of the engine.

The configuration makes it possible to improve the rigidity of the supporting portions of the pair of main frames that support the cabin 8 via the attachment stays, in particular, the rigidity of the supporting portions around a central axis extending in the vehicle longitudinal direction. As a result, the cabin is stably supported.

In a case where the pair of main frames are disposed outward from the pair of front frames in the vehicle width direction, and the front ends of the main frames are directly or indirectly coupled with the rear ends of the pair of front frames in a state of being overlapped therewith in a side view, the engine may preferably have a front portion supported in a vibration-isolation manner by the pair of front frames and a rear portion supported in a vibration-isolation manner by the bridge frame, in the state where the engine extends in the vehicle longitudinal direction so as to be across the overlapped regions where the pair of front frames and the pair of main frames are overlapped with each other.

According to the configuration, the front frame and the corresponding main frame are connected to each other at the overlapped region as well as are connected to each other through the engine. Therefore, the configuration makes it possible to have an effect of achieving easier handling thanks to adoption of a divisible structure of the vehicle frames including the front frames and the main frames that are detachably connected to each other, and also have an effect of preventing the deterioration in rigidity of the vehicle frames due to the divisible structure.

In a more preferable configuration, the front ends of the pair of main frames are coupled to the rear ends of the pair of front frames with spacers being interposed therebetween, respectively.

The configuration makes it possible to set a width (a distance in the vehicle width direction) between the pair of main frames freely and independently from a width between the pair of front frames.

In a preferable configuration, the cabin includes a lower frame portion, a vertical frame portion that is supported by the lower frame portion so as to stand upward, an upper frame portion that is supported by the upper end of the vertical frame portion, an outer roof that is placed on the upper frame portion, a floor portion that is supported by the lower frame portion, and an air separator plate that separates the cabin from an engine/flywheel unit that is disposed in front of the cabin. The lower frame portion includes a pair of lower inner side frames, a pair of lower outer side frames and a pair of coupling members. The pair of lower inner side frames are aligned in the vehicle longitudinal direction in a state of being disposed outward from the pair of main frames in the vehicle width direction such that gaps are formed between the pair of lower inner side frames and the pair of main frames, respectively, and also in a state of having upper surfaces located above the upper surfaces of the main frames. The pair of lower outer side frames are aligned in the vehicle longitudinal direction in a state of being disposed outward from the pair of lower inner side frames in the vehicle width direction and also in a state of having upper surfaces located at positions substantially identical with the upper surfaces of the lower inner side frames, respectively. Each of the pair of coupling members couples the corresponding lower inner side frame and the lower outer side frame and is supported by the attachment stay with an antivibration mechanism being interposed therebetween. The floor portion includes floor members that are placed directly or indirectly on the upper surfaces of the pair of lower inner side frames and the pair of lower outer side frames.

The working vehicle further includes a brake operation shaft, a first brake boss, a second brake boss, first and second brake pedals, a pair of right and left brake vertical links, and a pair of right and left brake horizontal links. The brake operation shaft is directly or indirectly supported by the air separator plate in a state of being aligned in the vehicle width direction and located closer to the inside of the cabin than the air separator plate. The first brake boss is supported by the brake operation shaft in relatively rotatable manner with respect thereto. The second brake boss is supported by the brake operation shaft in a relatively non-rotatable manner with respect thereto. The first and second brake pedals are coupled to the first and second brake bosses, respectively. The pair of brake vertical links are shifted substantially in the vertical direction in response to driver's operations to the first and second brake pedals, respectively. The pair of brake horizontal links operatively connect the pair of brake vertical links with a pair of right and left brake mechanisms provided to the transmission, respectively, and are shifted substantially in the forward/backward direction in response to the shifts of the pair of brake vertical links in the vertical direction. The air separator plate is provided with a pair of right and left bulging portions that bulge toward the inside of the cabin. The bulging portions are located outward from the pair of main frames in the vehicle width direction and below the brake operation shaft in the vertical direction. The lower ends of the pair of right and left brake vertical links extend downward from the inside of the cabin through the pair of right and left bulging portions, respectively. The lower ends of the pair of right and left brake vertical links are coupled with the front ends of the pair of right and left brake horizontal links, with a pair of right and left brake intermediate bosses being interposed therebetween, respectively. The brake intermediate bosses are supported respectively by a pair of right and left brake intermediate shafts in a relatively rotatable manner with respect thereto. The brake intermediate shaft is arranged in the gaps between the pair of main frames and the pair of lower inner side frames, respectively, so as to be located below the floor members as well as behind the attachment stays.

The configuration makes it possible to realize the reduction in space with no deterioration of workability in assembling the brake operation link mechanism that includes the brake vertical links and the brake horizontal links.

EMBODIMENT FOR CARRYING OUT THE INVENTION

Described below is a working vehicle provided with a cabin according to a preferred embodiment of the present invention with reference to the accompanying drawings.

Figure 1:
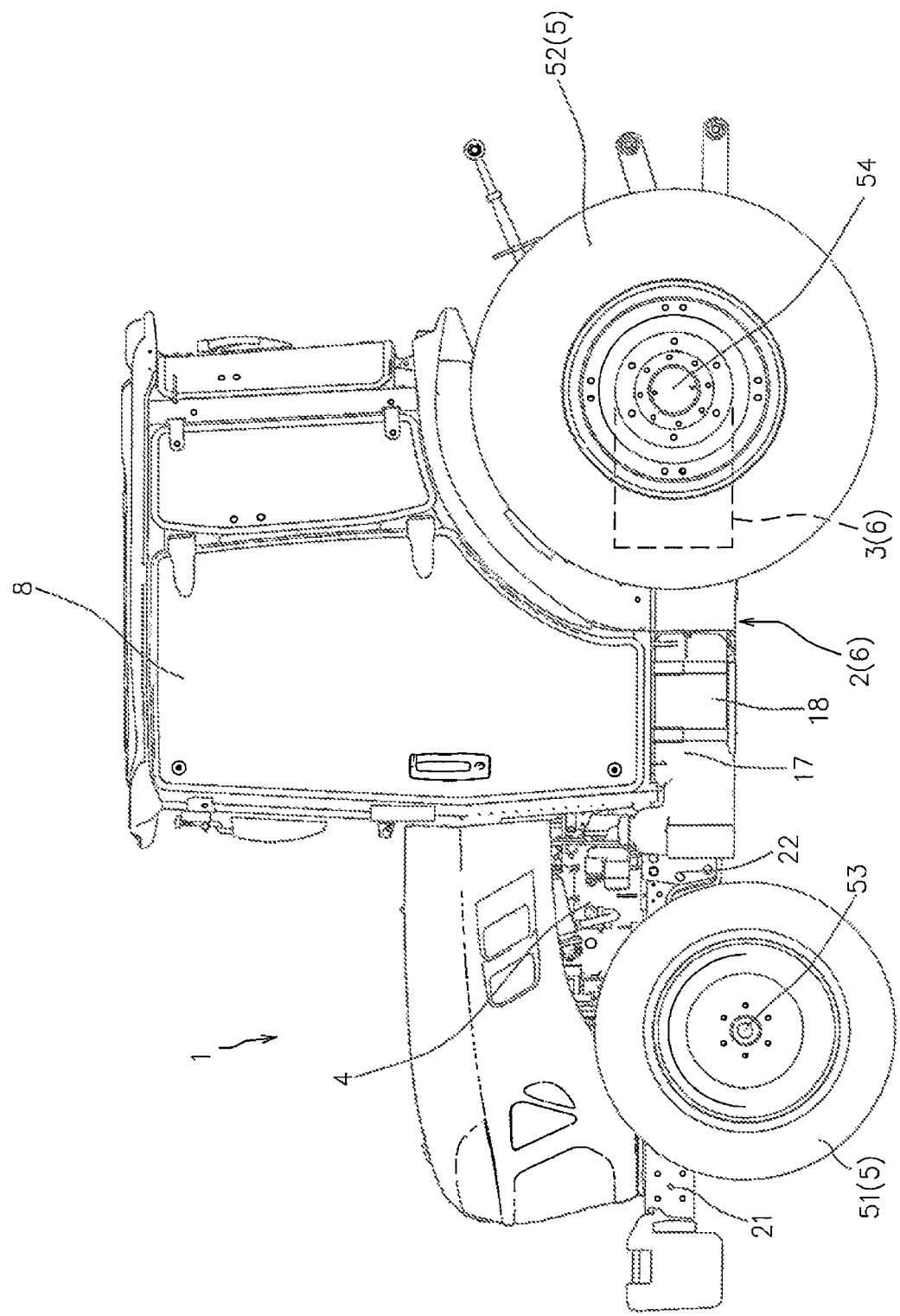
FIG. 1 is a left side view of a working vehicle according to an embodiment of the present invention.
Figure 2:
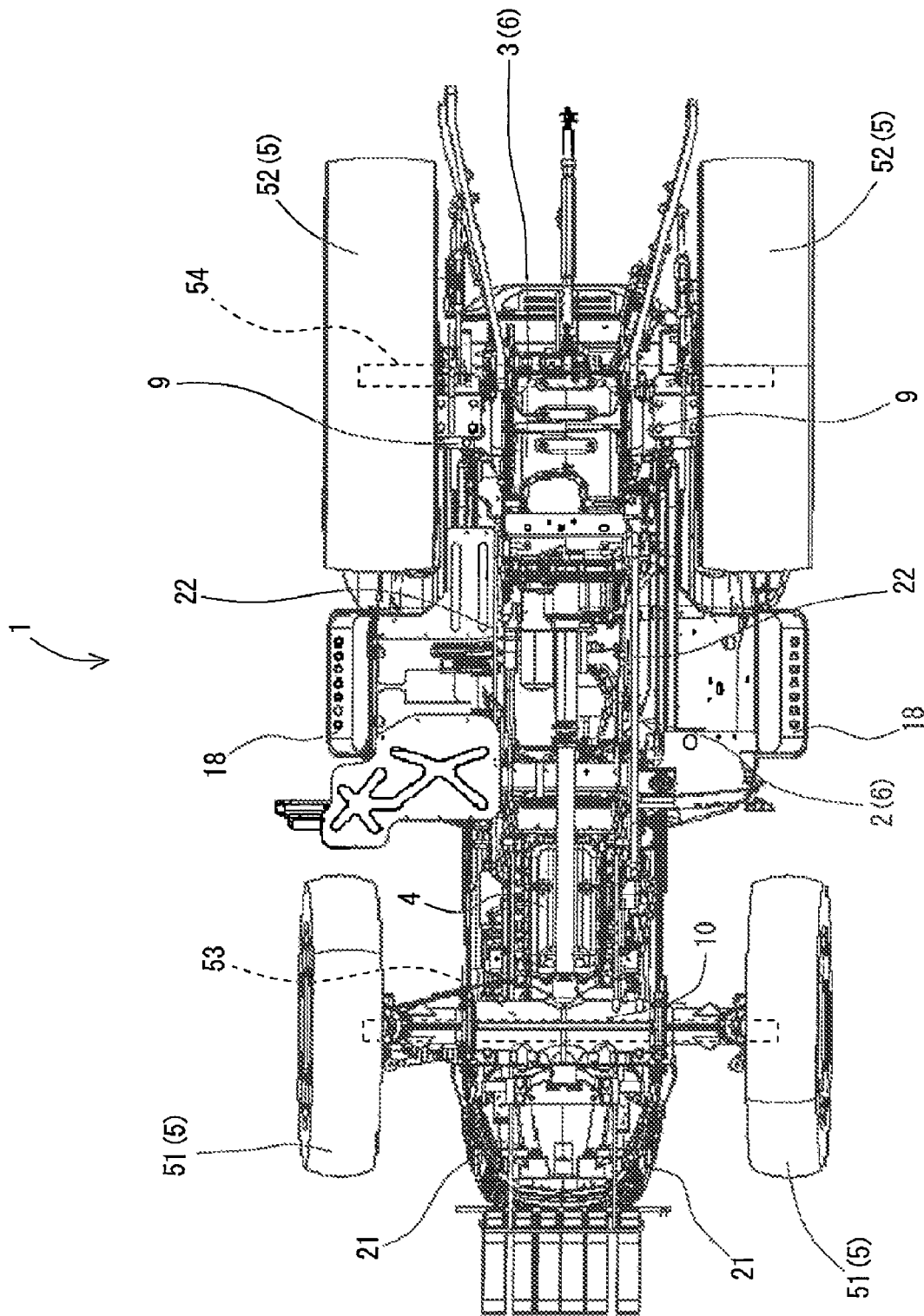
FIG. 2 is a bottom view of the working vehicle shown in FIG. 1.

FIGS. 1 and 2 are left side view and a bottom view, respectively, of a working vehicle 1 according to an embodiment of the present invention.

As shown in FIG. 1, the working vehicle 1 is configured as a tractor to which a working device is mountable.

More specifically, as shown in FIGS. 1 and 2, the working vehicle 1 includes a pair of right and left vehicle frames 2 along a vehicle longitudinal direction, a transmission case 3 coupled to the rear ends of the vehicle frames 2, an engine 4 supported by the vehicle frames 2, and a pair of right and left traveling units 5.

In the present embodiment, the pair of right and left traveling units 5 have a pair of right and left front wheels 51 and a pair of right and left rear wheels 52.

The working vehicle 1 is configured such that rotational power from the engine 4 is changed in speed at a transmission including the transmission case 3 and is then transmitted to the pair of right and left front wheels 51 or the pair of right and left rear wheels 52, which function as driving wheels.

As shown in FIG. 1, the working vehicle 1 further includes a cabin 8 that is supported by a fixed structural body 6, which has the vehicle frames 2 and the transmission case 3, with antivibration mechanisms (to be described later) being interposed therebetween.

As shown in FIG. 2, in the present embodiment, the transmission case 3 is coupled to the rear ends of the vehicle frames 2, and is disposed rearward at a distance from the engine 4. The transmission case 3 is also coupled, respectively at side walls, with a pair of rear axle cases 9 that accommodate a pair of rear axles 54 coupled to the pair of right and left rear wheels 52, respectively.

As shown in FIGS. 1 and 2, the vehicle frames 2 include a pair of right and left front frames 21, and a pair of right and left main frames 22. The pair of front frames 21 are disposed on a front side of the vehicle. The pair of main frames 22 couple the pair of front frames 21 and the right and left side walls of the transmission case 3, respectively.

The pair of front frames 21 support the engine 4 and a front axle case 10 that accommodates a front axle 53 coupled with the front wheels 51.

Figure 3:
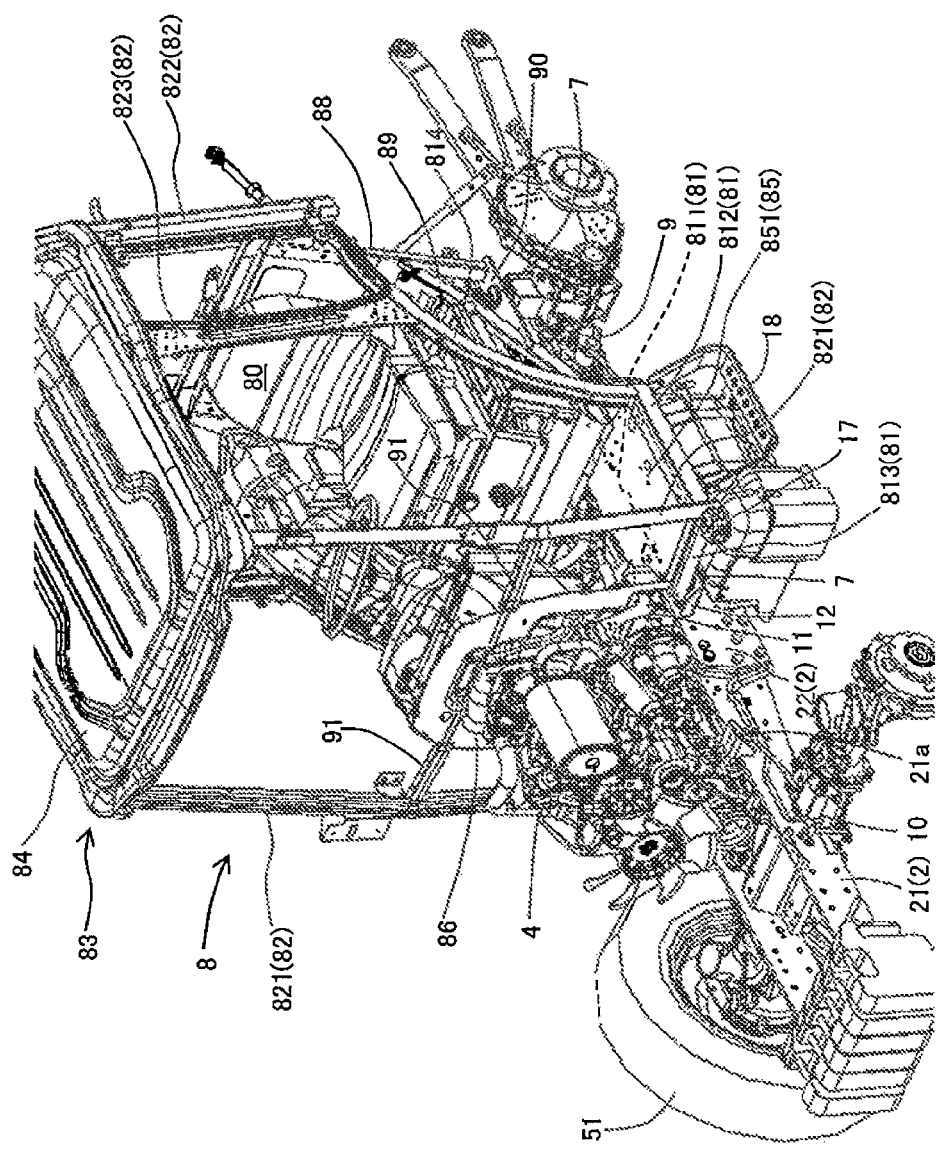
FIG. 3 is a perspective view, as viewed from the front, of an internal structure of the working vehicle shown in FIGS. 1 and 2.
Figure 4:
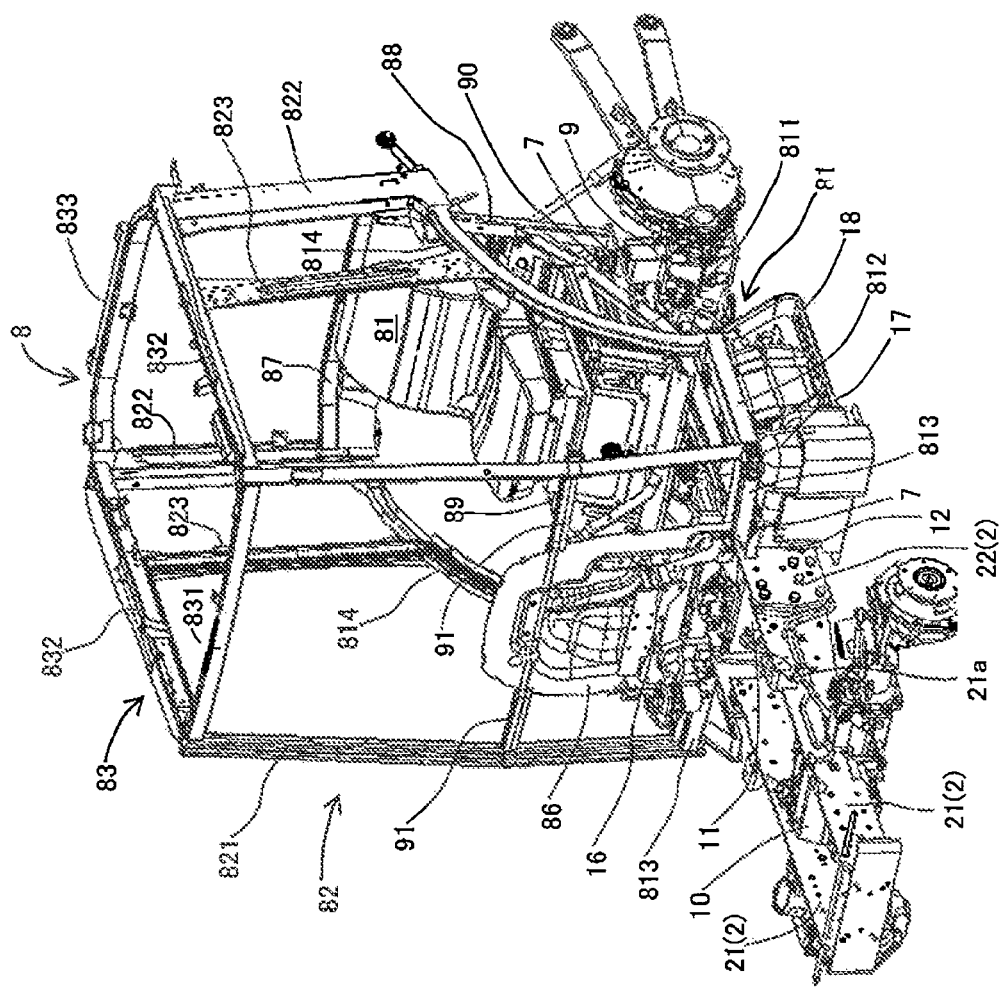
FIG. 4 is a perspective view, as viewed from the front, of a frame structure of the working vehicle shown in FIGS. 1 and 2.
Figure 5:
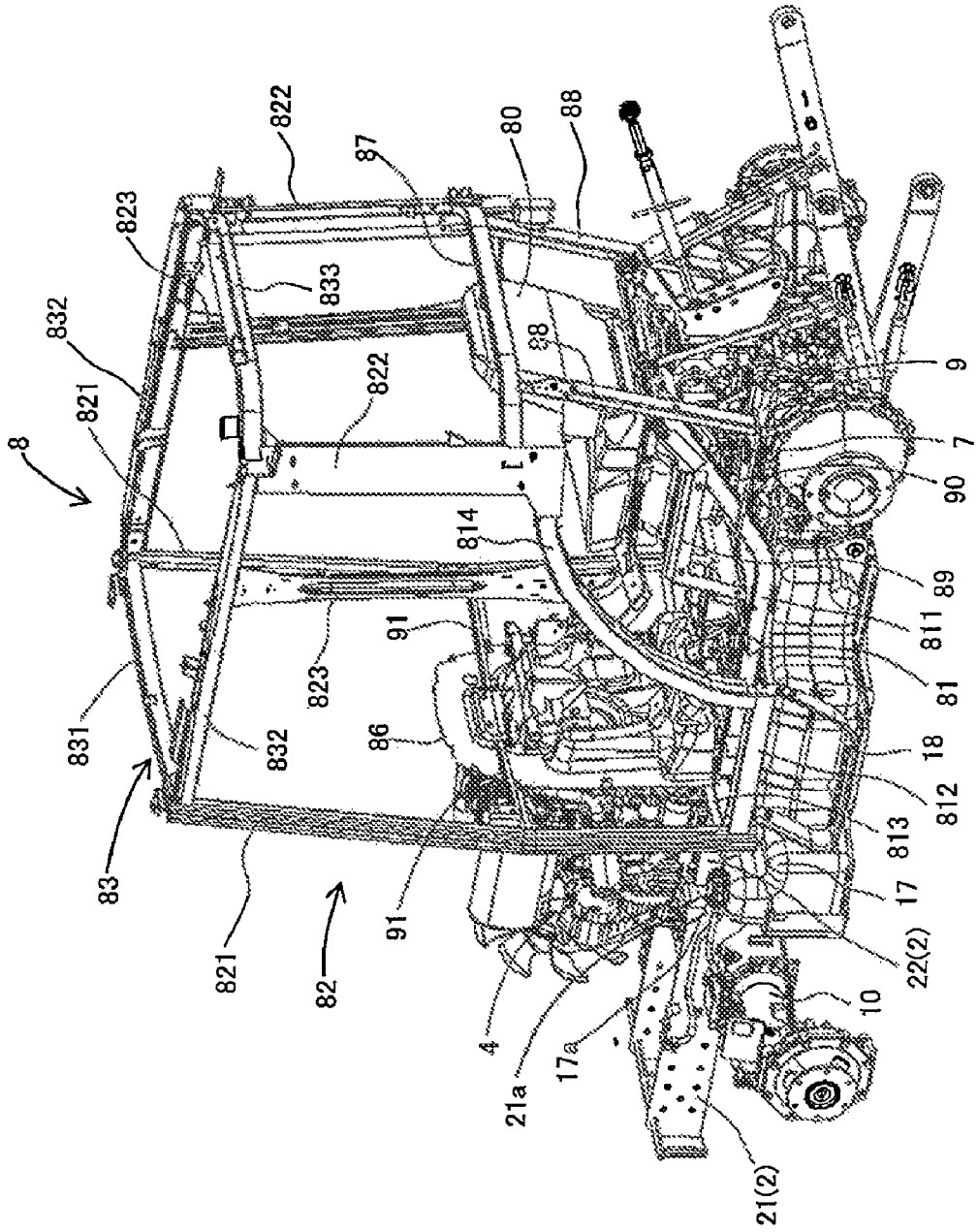
FIG. 5 is a perspective view, as viewed from the rear, of the frame structure of the working vehicle shown in FIGS. 1 and 2.

FIG. 3 is a perspective view, as viewed from the front, of an internal structure of the working vehicle 1 shown in FIGS. 1 and 2. FIGS. 4 and 5 are perspective views, as viewed from the front and the rear, respectively, of a frame structure of the working vehicle 1 shown in FIGS. 1 and 2. It is noted that the engine 4 is not illustrated in FIG. 4.

Figure 6:
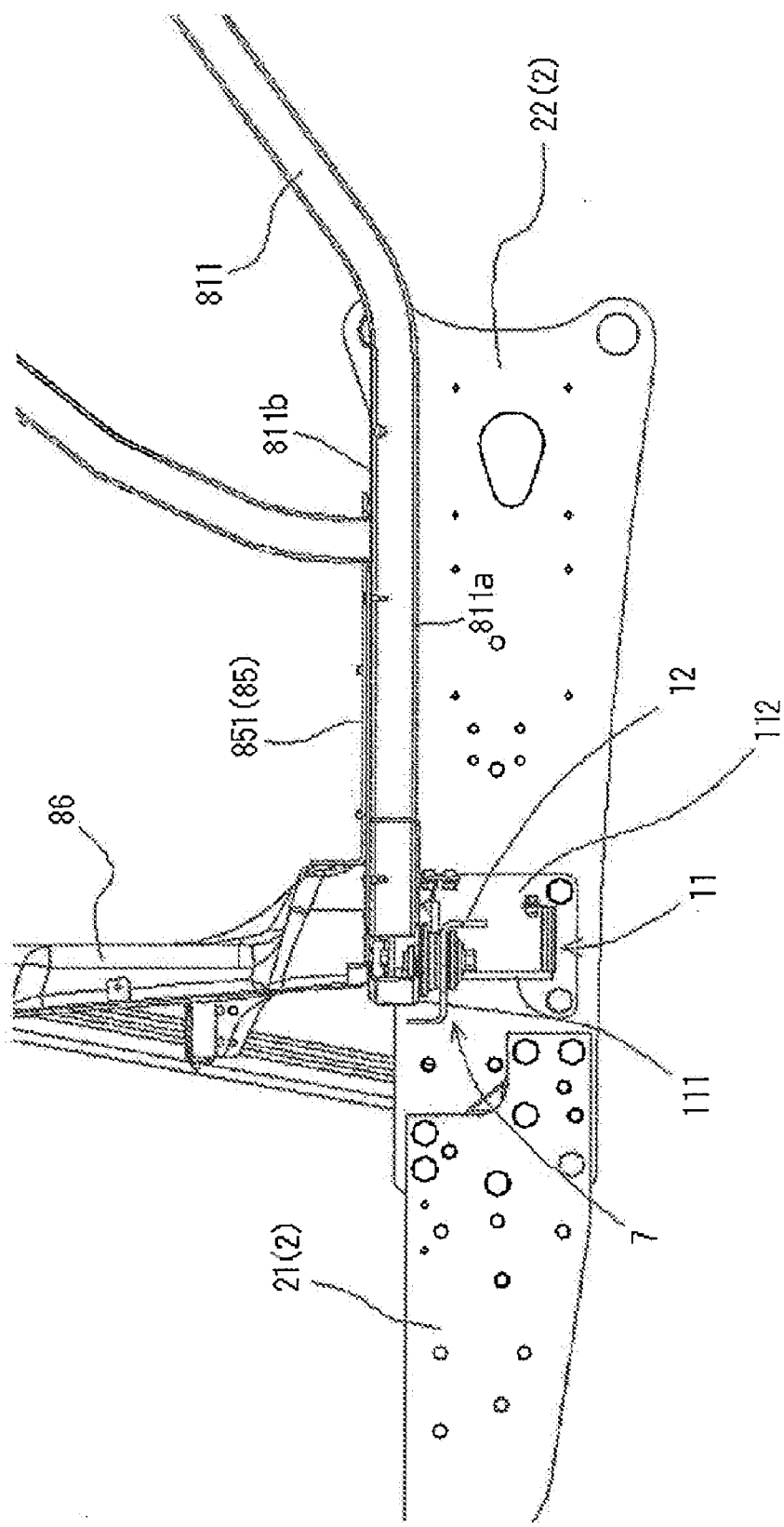
FIG. 6 is a side view of a main frame and the vicinity thereof in the frame structure of the working vehicle shown in FIGS. 1 and 2.

Further, FIG. 6 is a side view of one of the main frames 22 and the vicinity thereof in the frame structure of the working vehicle 1 shown in FIGS. 1 and 2. It is noted that the left main frame 22 out of the pair of main frames 22 is not illustrated in FIG. 6.

In the present embodiment, the cabin 8 is supported in a vibration-isolation manner by the fixed structural body 6 at four positions of front, rear, right, and left portions.

The above configuration is described in more detail. As shown in FIGS. 3, 4, and 6, the working vehicle 1 further includes a reinforcing member 11 and a pair of attachment stays 12. The reinforcing member 11 couples the pair of main frames 22 with each other in a state of being overlapped with the pair of main frames 22 in a side view. The pair of attachment stays 12 are fixedly attached to the outer side surfaces of the pair of main frames 22 so as to be at least partially overlapped with the reinforcing member 11 in a side view.

The cabin 8 is supported in a vibration-isolation manner at no less than four positions including the pair of attachment stays 12, and right and left supporting positions that are provided at the pair of rear axle cases 9 or the transmission case 3. As shown in FIGS. 3 to 5, in the present embodiment, the cabin 8 is supported at the four positions of the pair of attachment stays 12 and the pair of rear axle cases 9 with antivibration mechanisms 7 being interposed therebetween, respectively.

The configuration described above makes it possible to improve the balance between the front and rear portions of the working vehicle 1, since the engine 4 and the front axle case 10 are disposed closer to the front side and the transmission is disposed closer to the rear side in the vehicle longitudinal direction. Further, since the cabin 8 is supported in a vibration-isolation manner by highly rigid sites of the pair of main frames 22 that are coupled with each other by the reinforcing member 11, and also by the transmission case 3 or the rear axle cases 9, the configuration makes it also possible to enhance stabilization of support of the cabin 8, thereby realizing a desired antivibration effect for the cabin 8.

In the present embodiment, the reinforcing member 11 and the attachment stays 12 are located at substantially identical positions in the vehicle longitudinal direction as well as in the vehicle vertical direction. However, the above effect can be obtained as long as the reinforcing member 11 and the attachment stays 12 are at least partially overlapped with each other in a side view.

Figure 7:
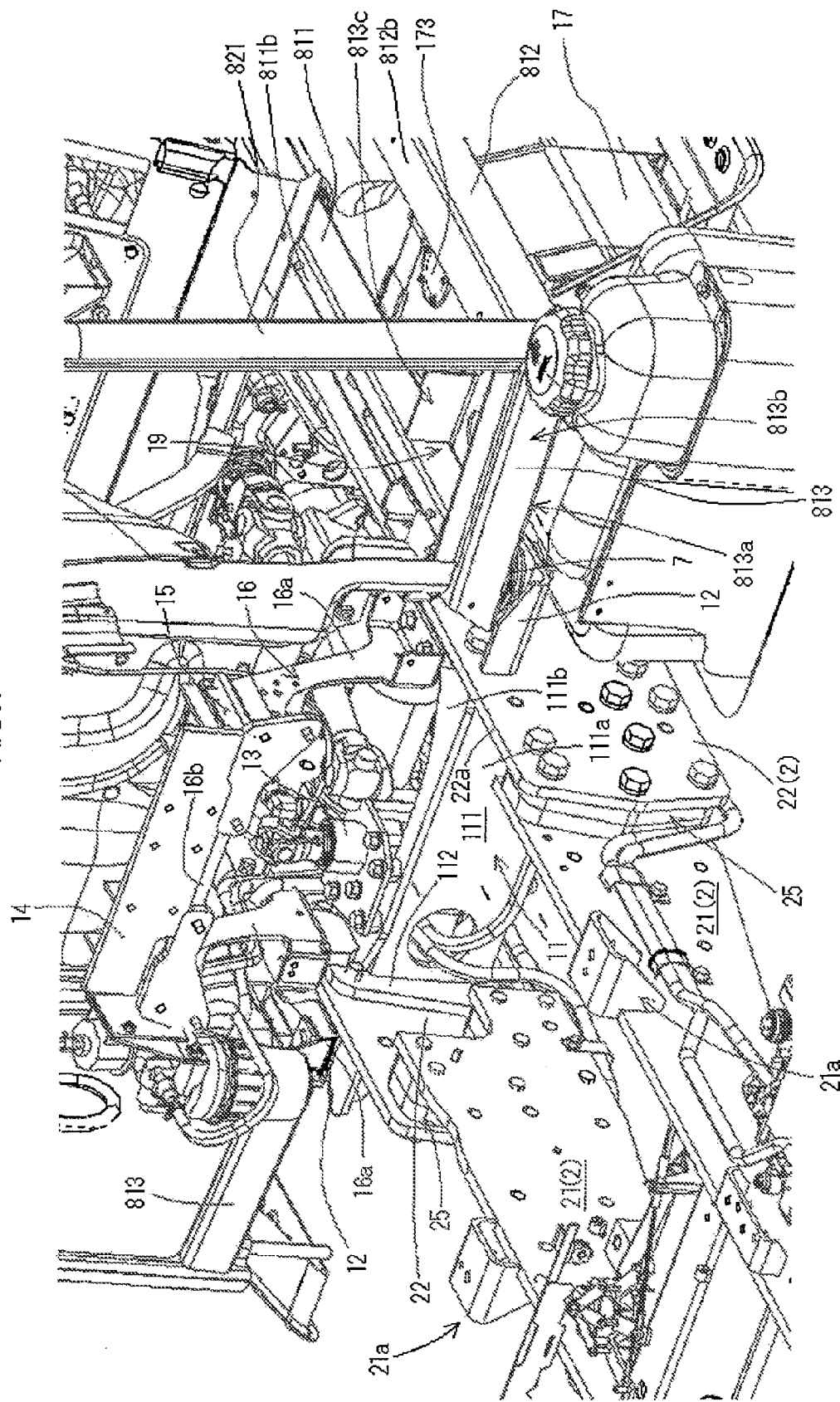
FIG. 7 is an enlarged perspective view of a reinforcing member and the vicinity thereof in the internal structure of the working vehicle shown in FIG. 3.

FIG. 7 is an enlarged perspective view of the reinforcing member 11 and the vicinity thereof in the internal structure of the working vehicle 1 shown in FIG. 3. It is noted that the engine 4 is not illustrated in FIG. 7.

As shown in FIGS. 6 and 7, in the present embodiment, the reinforcing member 11 has a widthwise extending portion 111 and a pair of flange portions 112. The widthwise extending portion 111 extends in the vehicle width direction. The pair of flange portions 112 are provided at the ends of the widthwise extending portion 111, respectively. The pair of flange portions 112 are brought into contact with the inner surfaces of the pair of main frames 22, respectively.

As shown in FIG. 7, the widthwise extending portion 111 has a vertical plate portion 111a and a horizontal plate portion 111b. The vertical plate portion 111a extends substantially in the vertical direction. The horizontal plate portion 111b extends substantially in the horizontal direction from the upper end of the vertical plate portion 111a. The horizontal plate portion 111b supports a power steering valve unit 13 that is bung thereon.

Figure 8:
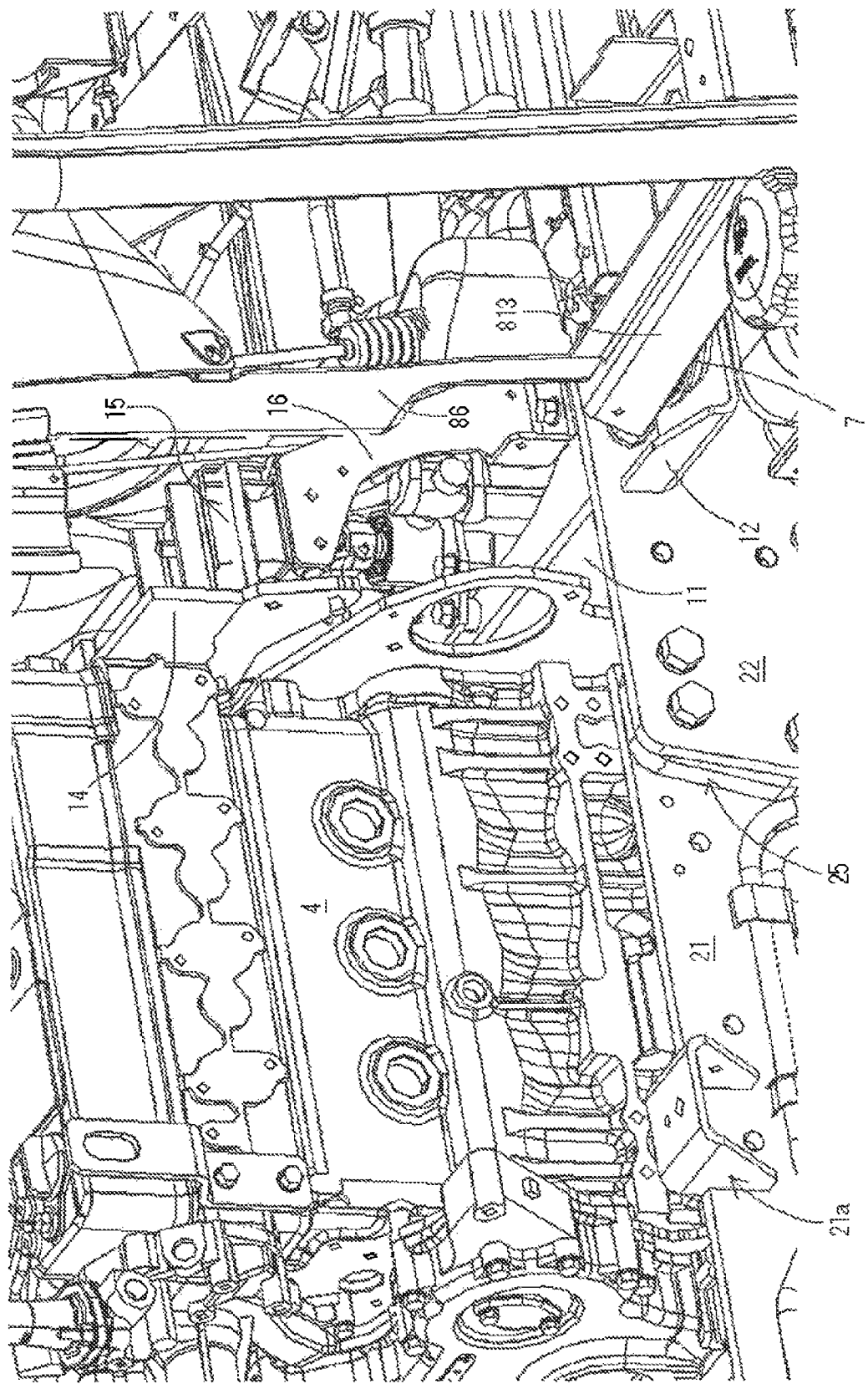
FIG. 8 is an enlarged perspective view of a supporting portion that at which a rear end of an engine is supported and the vicinity thereof, in the internal structure of the working vehicle shown in FIG. 3.

FIG. 8 is an enlarged perspective view of the supporting portion at which the rear end of the engine 4 is supported and the vicinity thereof, in the internal structure of the working vehicle 1 shown in FIG. 3.

As shown in FIG. 8, the front portion of the engine 4 is directly or indirectly supported in a vibration-isolation manner by the pair of front frames 21 and the rear portion thereof is directly or indirectly supported in a vibration-isolation manner by the pair of main frames 22, in a state where the engine 4 extends in the vehicle longitudinal direction so as to be across an overlapped region where the pair of front frames 21 and the pair of main frames 22 are overlapped with each other.

More specifically, as shown in FIGS. 7, 8, and the like, the pair of main frames 22 are disposed outward from the pair of front frames 21 in the vehicle width direction, and the front ends of the main frames 22 are directly or indirectly coupled with the rear ends of the pair of front frames 21 in a state of being overlapped therewith in a side view.

There are provided a pair of right and left engine support stays 21a that are fixedly attached to the pair of front frames 21, respectively.

The front portion of the engine 4 is supported by the pair of right and left engine support stays 21a with antivibration mechanisms (not shown) being interposed therebetween.

On the other hand, the rear portion of the engine 4 is coupled, with an antivibration mechanism 15 being interposed therebetween, to a bridge frame 16 that is supported by the reinforcing member 11 coupling the pair of main frames 22.

More specifically, as shown in FIGS. 7 and 8, the bridge frame 16 has a pair of side plate portions 16a and a coupling plate portion 16b. The pair of side plate portions 16a have lower ends coupled to the right and left ends of the reinforcing member 11 and upper ends extending upward, respectively. The coupling plate portion 16b couples the upper ends of the pair of side plate portions 16a.

The engine 4 is provided on the rear end surface with an engine mounting flange 14. The rear portion of the engine is supported in a vibration-isolation manner by the coupling plate portion 16b of the bridge frame with the engine mounting flange 14 and the antivibration mechanism 15 being interposed therebetween.

As described above, in the working vehicle 1 according to the present embodiment, the vehicle frames 2 is configured to have a divisible structure including the pair of front frames 21, and the pair of main frames 22 that are disposed outward from the pair of front frames 21 in the vehicle width direction and the front ends directly or indirectly coupled with the rear ends of the front frames 21 in a state of being respectively overlapped therewith in a side view. Further, the front portion of the engine 4 is supported in a vibration-isolation manner by the pair of front frames 21 and the rear portion thereof is supported in a vibration-isolation manner by the bridge frame 16, in the state where the engine 4 extends in the vehicle longitudinal direction so as to be across the overlapped regions where the pair of front frames 21 and the pair of main frames 22 are overlapped with each other.

The configuration described above achieves the coupling between the front frames 21 and the main frames 22 in the overlapped regions as well as the coupling therebetween via the engine 4.

Therefore, thanks to the adoption of the divisible structure in which the vehicle frames 2 are divided into the front frames 21 and the main frames 22, the configuration makes it possible to effectively achieve easier handling and also effectively prevent the deterioration in rigidity of the vehicle frames 2 due to the divisible structure.

Further, the bridge frame 16, which is coupled to the rear portion of the engine 4 with the antivibration mechanism 15 being interposed therebetween, is supported by the reinforcing member 11. Improved therefore is the rigidity of the pair of main frames 22 at the supporting portions at which the cabin 8 is supported via the attachment stays 12, particularly the rigidity at the supporting portions around central axis extending in the vehicle longitudinal direction. As a result, the cabin 8 can be supported more stably.

As shown in FIGS. 7, 8, and the like, in the present embodiment, the front ends of the pair of main frames 22 are coupled to the rear ends of the pair of front frames 21 with spacers 25 being interposed therebetween, respectively.

The configuration makes it possible to set a width (a distance in the vehicle width direction) between the pair of main frames 22 freely and independently from a width between the pair of front frames 21.

As shown in FIGS. 3 to 5, in the present embodiment, the cabin 8 includes a lower frame portion 81, a vertical frame portion 82, an upper frame portion 83, an outer roof 84, a floor portion 85, and an air separator plate 86. The vertical frame portion 82 is provided such as to stand upward from the lower frame portion 81. The upper frame portion 83 is supported by the upper end of the vertical frame portion 82. The outer roof 84 is placed on the upper frame portion 83. The floor portion 85 is supported by the lower frame portion 81. The air separator plate 86 separates the cabin 8 from an engine/flywheel unit that is disposed in front of the cabin 8. It is noted that the outer roof 84 and the floor portion 85 are not illustrated in FIGS. 4 and 5.

The lower frame portion 81 has a pair of lower inner side frames 811, a pair of lower outer side frames 812, and a pair of coupling members 813. The pair of lower inner side frames 811 are aligned in the vehicle longitudinal direction in a state of being disposed outward from the pair of main frames 22 in the vehicle width direction such that gaps are formed between the pair of lower inner side frames 811 and the pair of main frames 22, respectively, and also in a state of having upper surfaces located above the upper surfaces of the main frames 22. The pair of lower outer side frames 812 are aligned in the vehicle longitudinal direction in a state of being disposed outward from the pair of lower inner side frames 811 in the vehicle width direction, and also in a state of having upper surfaces located at positions substantially identical with the upper surfaces of the lower inner side frames 811, respectively. Each of the pair of coupling members 813 couples the corresponding lower inner side frame 811 and the lower outer side frame 812 and is supported by the attachment stay 12 with the antivibration mechanism 7 being interposed therebetween.

As shown in FIG. 3, the floor portion 85 has floor members 851 that are placed directly or indirectly on the upper surfaces of the pair of lower inner side frames 811 and the pair of lower outer side frames 812, respectively.

Described below is a brake operation mechanism of the working vehicle 1 according to the present embodiment.

Figure 9:
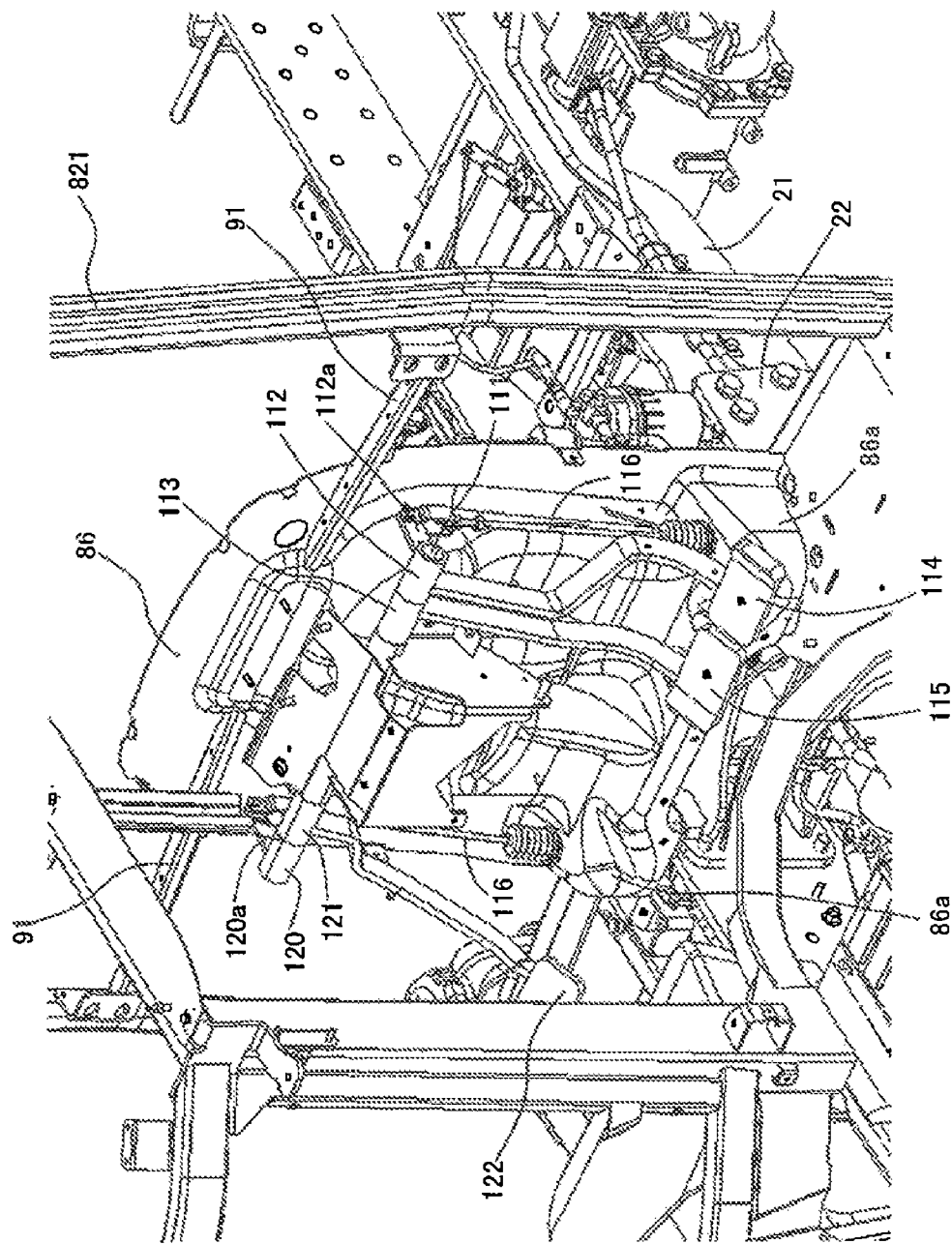
FIG. 9 is a perspective view, as viewed from inside of a cabin, of a brake operation mechanism and the vicinity thereof in the internal structure of the working vehicle shown in FIG. 3.
Figure 10:
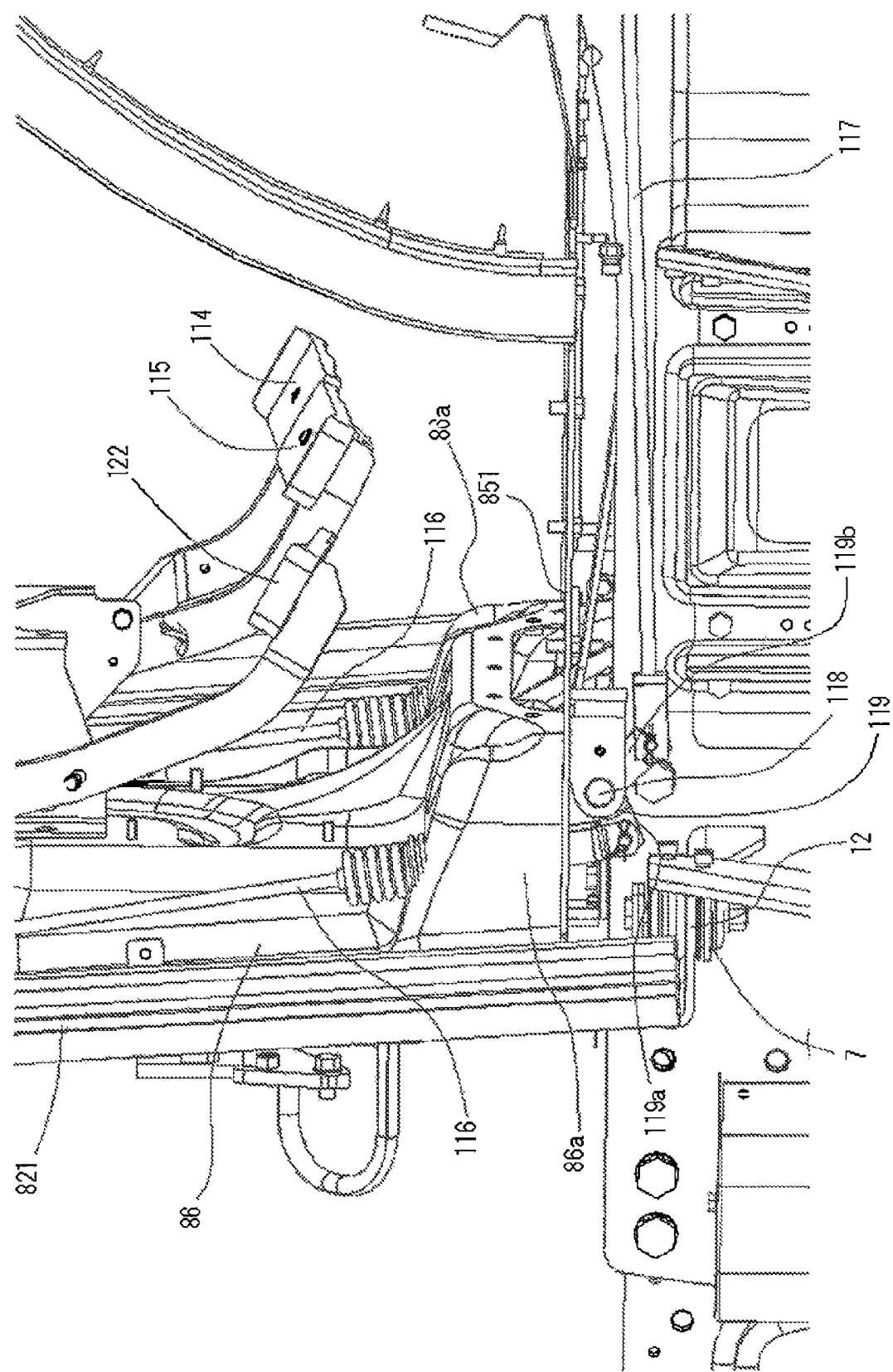
FIG. 10 is an enlarged perspective view, as viewed from a side, of a lower portion of the brake operation mechanism shown in FIG. 9.
Figure 11:
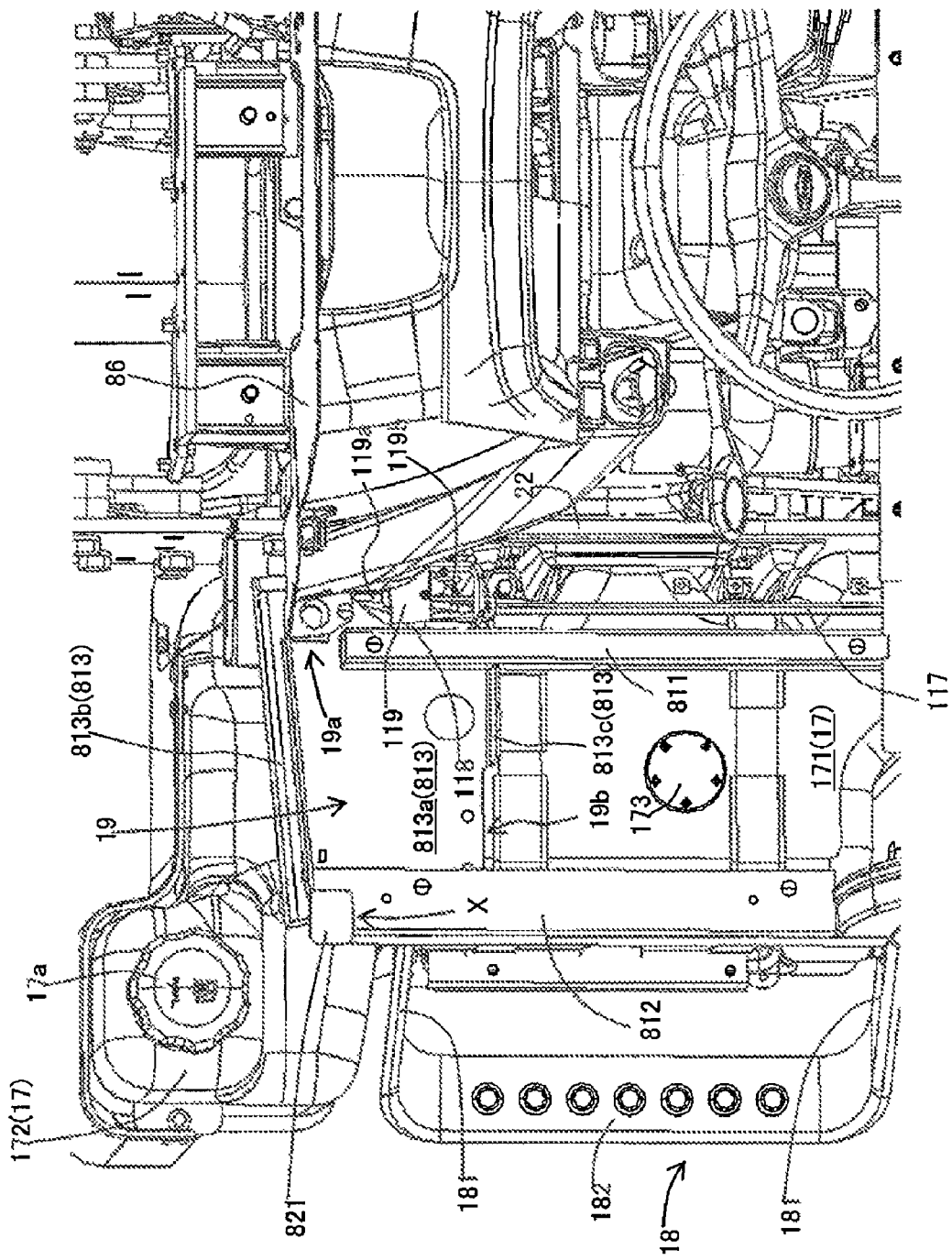
FIG. 11 is a plan view, as viewed from inside of the cabin, of the brake operation mechanism shown in FIGS. 9 and 10.

FIG. 9 is a perspective view, as viewed from inside of the cabin 8, of the brake operation mechanism and the vicinity thereof in the internal structure of the working vehicle 1 shown in FIG. 3. FIG. 10 is an enlarged perspective view, as viewed from a side, of a lower portion of the brake operation mechanism shown in FIG. 9. FIG. 11 is a plan view, as viewed from inside of the cabin 8, of the brake operation mechanism shown in FIGS. 9 and 10. It is noted that the lower inner side frames 811 and the lower outer side frames 812 are not illustrated in FIG. 10.

As shown in FIGS. 9 and 10, the working vehicle 1 includes a brake operation shaft 111, a first brake boss 112, a second brake boss 113, and first and second brake pedals 114 and 115. The brake operation shaft 111 is directly or indirectly supported by the air separator plate 86 in a state of being aligned in the vehicle width direction and located closer to the inside of the cabin 8 than the air separator plate 86. The first brake boss 112 is supported by the brake operation shaft 111 in a relatively rotatable manner with respect thereto. The second brake boss 113 is supported by the brake operation shaft 111 in a relatively non-rotatable manner with respect thereto. The first and second brake pedals 114 and 115 are coupled to the first and second brake bosses 112 and 113, respectively. The working vehicle 1 further includes a pair of right and left brake vertical links 116 and a pair of right and left brake horizontal links 117. The pair of brake vertical links 116 are shifted substantially in the vertical direction in response to driver's operations to the first and second brake pedals 114 and 115, respectively. The pair of brake horizontal links 117 operatively connect the pair of brake vertical links 116 with a pair of right and left brake mechanisms (not shown) provided to the transmission, respectively. The pair of brake horizontal links 117 are shifted substantially in the forward/backward direction in response to the shifts of the pair of brake vertical links 116 in the vertical direction.

The air separator plate 86 is provided with a pair of right and left bulging portions 86a that bulge toward the inside of the cabin 8. The pair of bulging portions 86a are located outward from the pair of main frames 22 in the vehicle width direction, and below the brake operation shaft 111 in the vertical direction.

The lower ends of the pair of right and left brake vertical links 116 extend downward from the inside of the cabin 8 through the pair of right and left bulging portions 86a, respectively.

As shown in FIGS. 10 and 11, the lower ends of the pair of right and left brake vertical links 116 are coupled with the front ends of the pair of right and left brake horizontal links 117, with a pair of right and left brake intermediate bosses 119 being interposed therebetween, respectively. The pair of brake intermediate bosses 119 are supported respectively by a pair of right and left brake intermediate shafts 118 in a relatively rotatable manner with respect thereto, the pair of brake intermediate shaft 118 are arranged in the gaps between the pair of main frames 22 and the pair of lower inner side frames 811, respectively, so as to be located below the floor members 851 as well as behind the attachment stays 12. More specifically, each of the brake intermediate bosses 119 is provided with a vertical link coupling plate 119a that is coupled with the corresponding brake vertical link 116 and a horizontal link coupling plate 119b that is coupled with the corresponding brake horizontal link 117.

The configuration described above can realize the reduction in space with no deterioration of workability in assembling the brake operation link mechanism that includes the brake vertical links 116 and the brake horizontal links 117.

As shown in FIG. 9, in the present embodiment, the first brake pedal 114 and the second brake pedal 115 are disposed side by side in the vehicle width direction and are located on the right and rear side of the air separator plate 86.

The first brake boss 112 is provided as a right brake boss that is supported at the right end of the brake operation shaft 111. The second brake boss 113 is provided as a left brake boss that is supported by the brake operation shaft 111 on the immediate left of the first brake boss 112.

The upper end of the right brake vertical link 116 is coupled to a plate member 112a that is fixedly attached to the first brake boss 112. When the first brake pedal 114 is operated by a driver, the right brake mechanism is actuated via the first brake boss 112, the right brake vertical link 116, and the right brake horizontal link 117.

On the other hand, the upper end of the left brake vertical link 116 is coupled to a plate member 120a that is fixedly attached to a brake relay boss 120, which is in turn fixed to the brake operation shaft 111 in a relatively non-rotatable manner with respect thereto. When the second brake pedal 115 is operated by a driver, the left brake mechanism is actuated via the second brake boss 113, the brake operation shaft 111, the brake relay boss 120, the left brake vertical link 116, and the left brake horizontal link 117.

As shown in FIG. 9, in the present embodiment, the working vehicle 1 further includes a clutch boss 121 and a clutch pedal 122. The clutch boss 121 is supported by the brake operation shaft 111 in a relatively rotatable manner with respect thereto, and the clutch pedal 122 is coupled to the clutch boss 121. The clutch boss 121 is operatively connected to a clutch (not shown) via a clutch link.

The clutch boss 121 is supported by the brake operation shaft 111 on the immediate right of the brake relay boss 120. The clutch pedal 122 is disposed on the left and rear side of the air separator plate 86.

As shown in FIGS. 3 to 5, in the present embodiment, the vertical frame portion 82 includes a pair of vertical front frames 821 that are welded to the front ends of the pair of lower outer side frames 812, respectively, so as to be aligned substantially in the vertical direction.

As shown in FIGS. 7 and 11, the pair of coupling members 813 each have a support surface portion 813a that couples the front portions on the lower surfaces of the lower outer side frame 812 and the lower inner side frame 811 being located on the same side in the vehicle width direction and is supported by the corresponding vehicle frame 2 with the antivibration mechanism 7 being interposed therebetween.

As shown in FIGS. 1, 3 to 7, and 11, in the present embodiment, the working vehicle 1 includes an oil tank 17 that is supported by one of the pair of vehicle frames 2 so as to be located outward from the same one of the vehicle frames 2 in the vehicle width direction as well as to be partially located immediately below the cabin 8.

Figure 12:
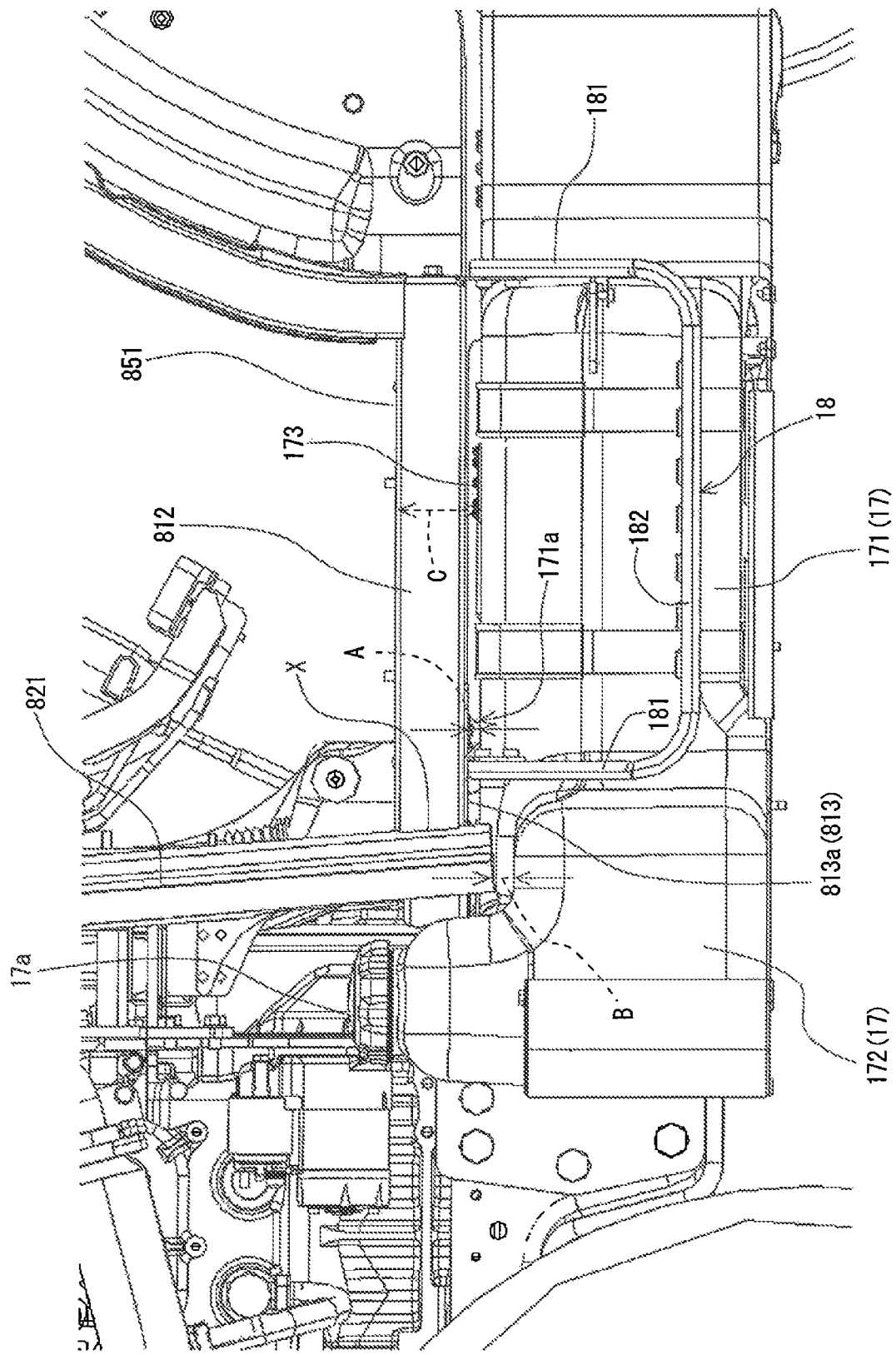
FIG. 12 is an enlarged side view of an oil tank and the vicinity thereof in the working vehicle shown in FIGS. 1 and 2.

FIG. 12 is an enlarged side view of the oil tank 17 and the vicinity thereof in the working vehicle 1 shown in FIGS. 1 and 2.

As shown in FIGS. 11 and 12, the oil tank 17 has a main body portion 171 and an extending portion 172. The main body portion 171 is disposed immediately below the cabin 8 with a gap being provided therebetween. The extending portion 172 extends from the main body portion 171 so as not to be overlapped with the cabin 8 in a plan view, and is also provided with an oil supply port 17a.

The main body portion 171 of the oil tank 17 has a horizontal plane facing region 171a that faces a horizontal plane of the cabin 8.

In the present embodiment, the horizontal plane of the cabin 8 is configured by the support surface portions 813a of the coupling members 813.

As shown in FIG. 12, the oil tank 17 is shaped such that, a gap A between the support surface portion 813a and the horizontal plane facing region 171a of the main body portion 171 that faces the support surface portion 813a is smaller than a gap between a remaining region other than the horizontal plane facing region 171a.

In other words, for example, the oil tank 17 is shaped such that a gap B between the lower end of the corresponding vertical front frame 821 and the upper surface of the oil tank 17 that faces the lower end is larger than the gap A.

The above structure increases as much as possible the reservoir space of the oil tank 17 as well as effectively prevents the oil tank 17 from being damaged by any component of the cabin 8 such as the vertical front frame 821.

In other words, in the working vehicle 1, the oil tank 17 has the main body portion 171 that is located immediately below the cabin 8 as well as the extending portion 172 that extends from the main body portion 171 so as not to be overlapped with the cabin 8 in a plan view and is also provided with the oil supply port 17a, thereby successfully increasing the reservoir space of the oil tank 17.

Further, the oil tank 17 is configured such that, the vertical gap A between the cabin 8 and the horizontal plane facing region 171a of the main body portion 171 that faces the horizontal plane (in the present embodiment, the support surface portions 813a of the coupling members 813) of the cabin 8 is smaller than the vertical gap (such as the gap B) between the cabin 8 and any remaining region other than the horizontal plane facing region 171a. Accordingly, in such a case where the working vehicle 1 falls, even if a large force is applied to the cabin 8 to curve any one of the frames configuring the cabin 8 and thereby bring the cabin 8 into contact with the oil tank 17, the horizontal plane facing region 171a of the oil tank 17 is brought into contact with the horizontal plane of the cabin 8. In other words, it is effectively prevented that any portions projecting downward, such as the lower end of the corresponding vertical front frame 821, are brought into contact with the oil tank 17 when the working vehicle 1 falls or the like. Therefore, the configuration makes it possible to increase as much as possible the size of the reservoir space of the oil tank 17 by bulging upward such as to decrease the gap between the oil tank 17 and the cabin 8, while effectively preventing the oil tank 17 from being damaged when the working vehicle falls or the like.

Figure 13:
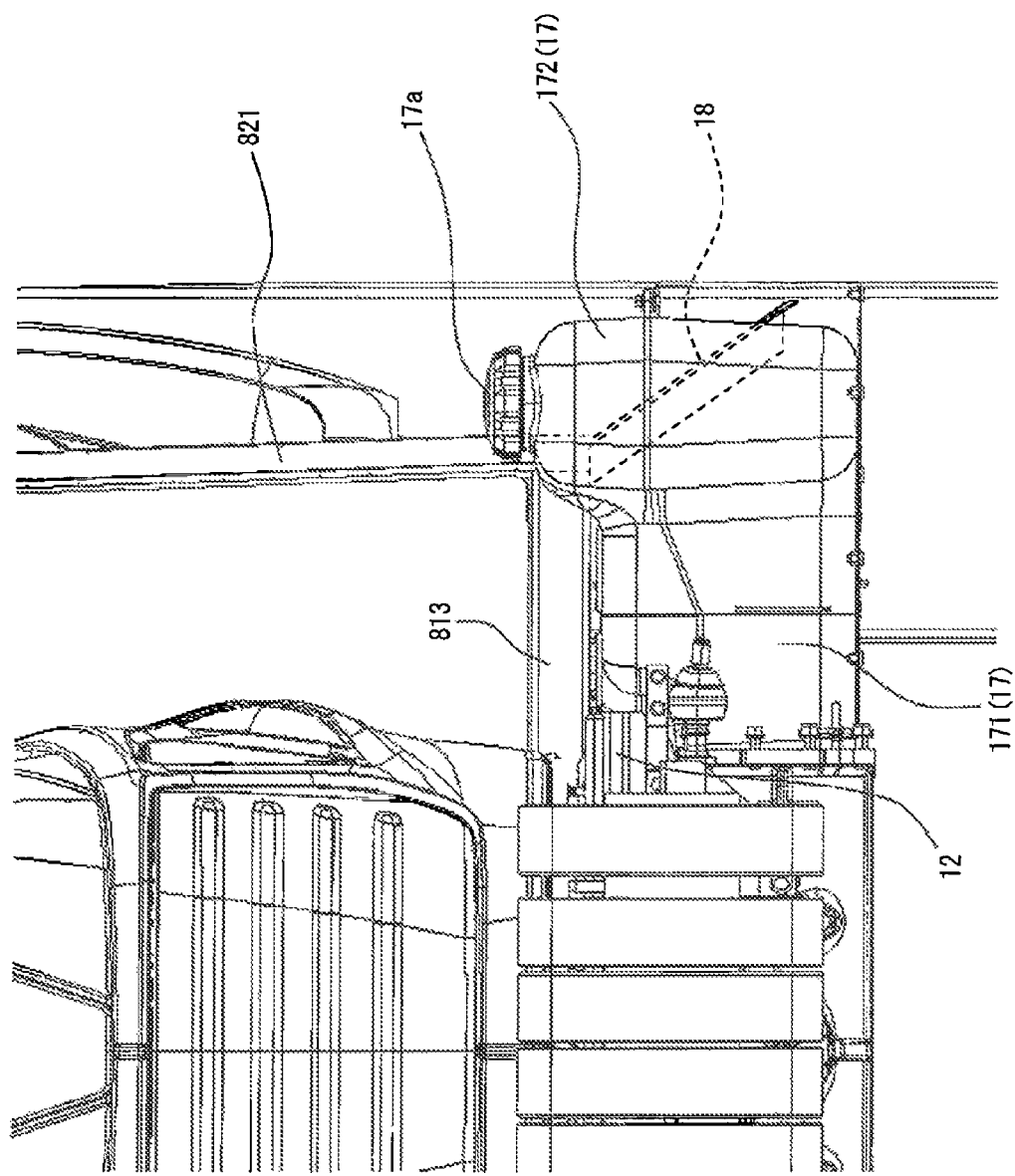
FIG. 13 is a front view of the oil tank and the vicinity thereof in the working vehicle shown in FIGS. 1 and 2.

FIG. 13 is a front view of the oil tank 17 and the vicinity thereof in the working vehicle 1 shown in FIGS. 1 and 2.

As shown in FIGS. 1 to 5 and 11 to 13, in the present embodiment, the cabin 8 has riding steps 18 that are coupled to the lower outer side frames 812, respectively.

More specifically, as shown in FIGS. 11 and 12, each of the riding steps 18 has a pair of arm portions 181 and a step portion 182. The pair of arm portions 181 has an upper end coupled to the corresponding one of the lower outer side frames 812, and extends downward and outward in the vehicle width direction from the upper end. The step portion 182 couples the lower ends of the pair of arm portions 181.

As shown in FIGS. 11 to 13, the extending portion 172 extends forward and outward in the vehicle width direction from the main body portion 171 and passes immediately below a welded point X between the corresponding vertical front frame 821 and the corresponding lower outer side frame 812, so as to be located in front of the corresponding riding step 18 as well as to be overlapped with this riding step 18 in a front view.

The above configuration makes it possible to allow the oil tank 17 to have the extending portion 172 while substantially preventing the oil tank 17 from projecting outward in the width direction of the working vehicle 1. Further, in the configuration, the corresponding riding step 18 can prevent the extending portion 172 from being brought into contact with any external member located in the backward direction while the vehicle is traveling backward.

As shown in FIGS. 11 and 12, in the present embodiment, the oil tank 17 is provided with a reserved oil residual quantity sensor 173 at a region other than the horizontal plane facing region 171a on the upper surface of the main body portion 171.

The configuration makes it possible to effectively prevent the reserved oil residual quantity sensor 173 from being damaged by the cabin 8.

As shown in FIG. 12, in the present embodiment, the reserved oil residual quantity sensor 173 is located behind the rear end of the horizontal plane (in the present embodiment, the support surface portions 813a of the coupling members 813) of the cabin 8 in the vehicle longitudinal direction. Further, as shown in FIG. 11, in the present embodiment, the reserved oil residual quantity sensor 173 is located between the corresponding lower inner side frame 811 and the corresponding lower outer side frame 812 in the vehicle width direction. Accordingly, as shown in FIG. 12, a gap between the upper surface of the reserved oil residual quantity sensor 173 and the cabin 8 is defined by a gap C between the upper surface of the reserved oil residual quantity sensor 173 and corresponding one of the floor members 851, the gap C being larger than the gap A.

In the above configuration, in such a case where the working vehicle 1 falls, even if large force is applied to the cabin 8, the reserved oil residual quantity sensor 173 is effectively prevented from being brought into contact with the cabin 8.

As shown in FIG. 11, in the present embodiment, each of the lower inner side frames 811 is disposed such that the front end thereof is located behind the front end of the corresponding lower outer side frame 812.

As shown in FIGS. 7 and 11, each of the coupling members 813 has a front surface portion 813b that is bent upward from the front end of the corresponding support surface portion 813a so as to cover the front end of the corresponding lower outer side frame 812.

In the above configuration, the lower inner side frame 811, the lower outer side frame 812, the coupling member 813, and the floor member 851 form a bag portion 19, which is opened toward the rear end and the inner end in the vehicle width direction.

More specifically, as shown in FIG. 11, the bag portion 19 has an inside opening 19a that is configured by the lower surface of the floor member 851, the front surface portion 813b and the support surface portion 813a of the coupling member 813, and the front end of the lower inner side frame 811. Further, the bag portion 19 has a rear opening 19b that is configured by the lower surface of the floor member 851, the outer side surface of the lower inner side frame 811, and the inner side surface of the lower outer side frame 812.

In the configuration described above, each of the bag portions 19 can be utilized as a route for installing, for example, an air conditioner hose that has a first end connected to a compressor disposed near the engine 4 and a second end connected to an air conditioner unit in the cabin 8 through an opening provided at the rear end of the cabin 8, a heater hose that imports water warmed by heat of the engine 4 into the air conditioner unit in the cabin 8 through the opening provided at the rear end of the cabin 8, and/or an accelerator wire that has a first end connected to a governor of the engine 4 and a second end connected to an accelerator operation member in the cabin 8.

As shown in FIGS. 7 and 11, in the present embodiment, each of the support surface portions 813a of the coupling members 813 has an upper surface fixedly attached to the lower surfaces of the corresponding lower inner side frame 811 and the corresponding lower outer side frame 812, and a lower surface supported by the corresponding antivibration mechanism 7.

Figure 14:
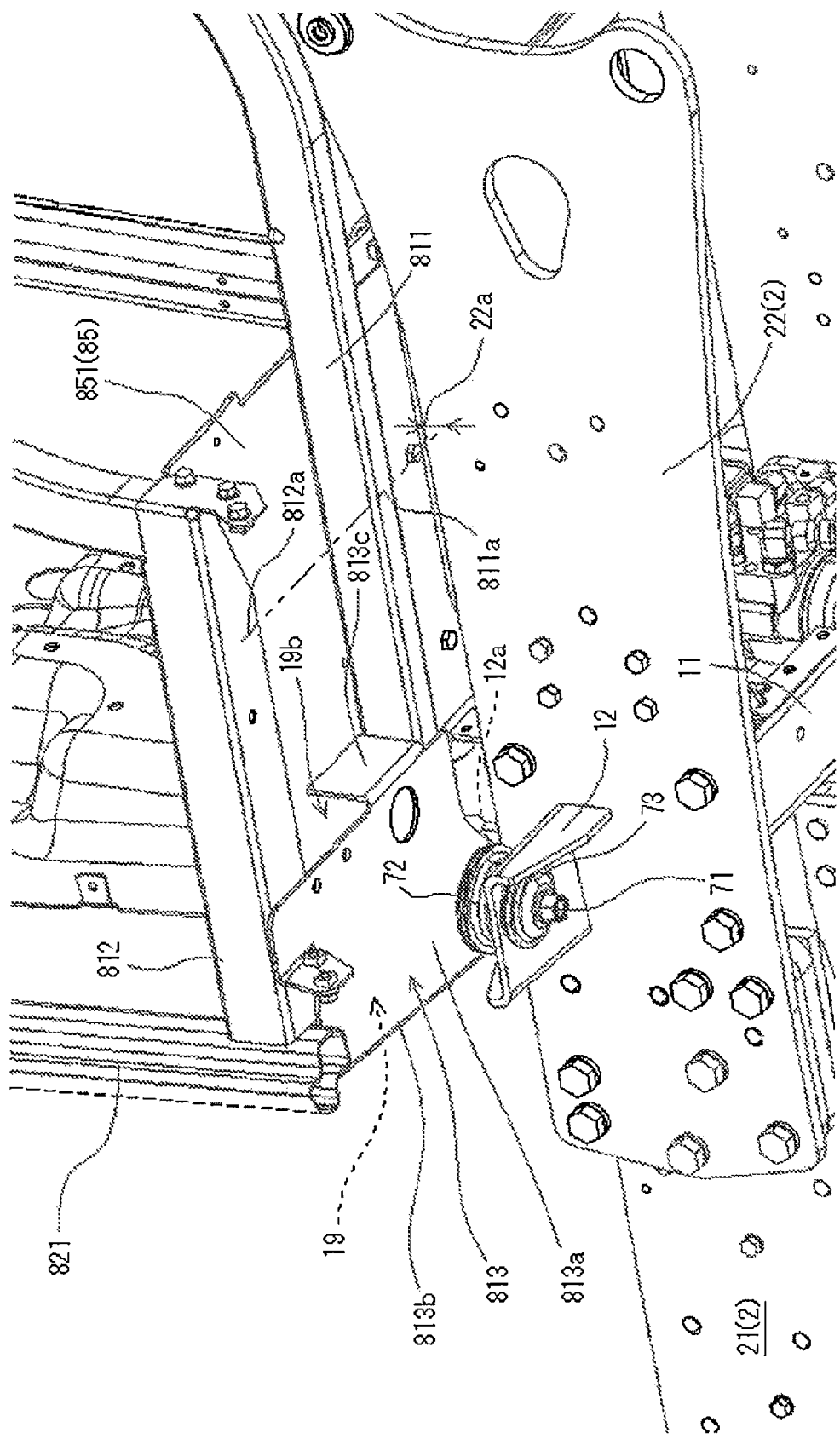
FIG. 14 is a view, as viewed from below and behind, of an antivibration mechanism and the vicinity thereof, which supports the front portion of the cabin in the working vehicle according to the embodiment.
Figure 15:
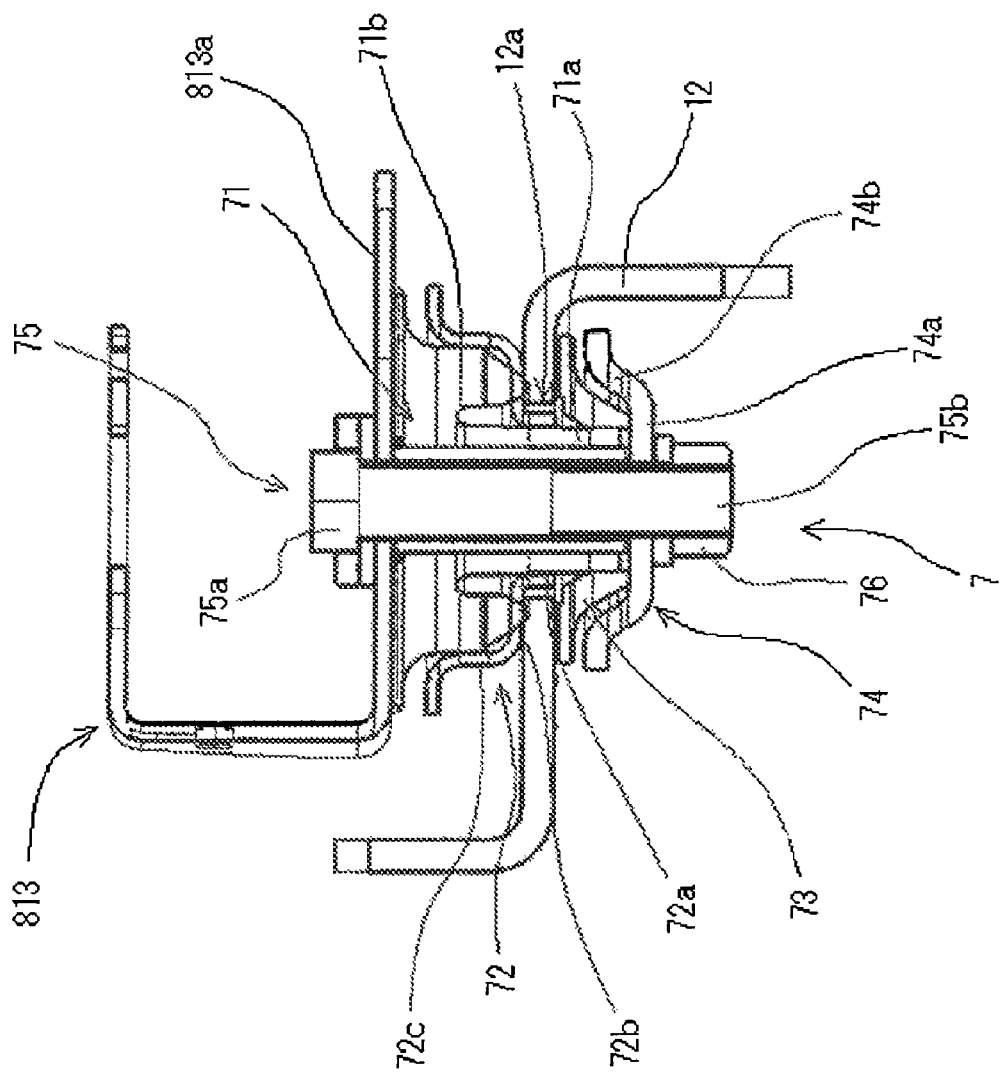
FIG. 15 is a vertical sectional view of the antivibration mechanism shown in FIG. 14.

FIG. 14 is a view, as viewed from below and behind, of the antivibration mechanism 7 and the vicinity thereof, which supports the front portion of the cabin 8 in the working vehicle 1 according to the present embodiment. FIG. 15 is a vertical sectional view of the antivibration mechanism 7 shown in FIG. 14.

In the present embodiment, as shown in FIGS. 14 and 15, each of the antivibration mechanisms 7 is provided with a first antivibration rubber 71 that has a hollow small diameter portion 71a and a large diameter portion 71b. The small diameter portion 71a is inserted through an attachment hole 12a that is formed in the attachment stay 12 and extends in the vertical direction. The large diameter portion 71b extends radially outward from a portion of the small diameter portion 71a at a position above the attachment stay 12. The large diameter portion 71b has an upper end surface that is directly or indirectly brought into contact with the lower surface of the support surface portion 813a of the coupling member 813, and the lower surface that is directly or indirectly brought into contact with the upper surface of the attachment stay 12, whereby the cabin 8 is supported by the attachment stays 12 in a vibration-isolation manner.

In the present embodiment, as shown in FIGS. 14 and 15, the antivibration mechanism 7 includes, in addition to the first antivibration rubber 71 detailed above, a first attachment cover 72, a second antivibration rubber 73, a second attachment cover 74, and a fastening bolt 75. The first attachment cover 72 is inserted between the first antivibration rubber 71 and the attachment stay 12. The second antivibration rubber 73 is externally attached to a portion of the small diameter portion 71a of the first antivibration rubber 71, the portion being positioned below the attachment stay 12. The second attachment cover 74 covers the lower end surface of the second antivibration rubber 73. The fastening bolt 75 is inserted into the small diameter portion 71a.

The first attachment cover 72 has a small diameter cylindrical portion 72a, a radially extending portion 72b, and a peripheral wall portion 72c. The small diameter cylindrical portion 72a is inserted from above into the attachment hole 12a of the attachment stay 12, and allows the small diameter portion 71a to be inserted thereinto. The radially extending portion 72b is radially extended outward from the upper end of the small diameter cylindrical portion 72a. The peripheral wall portion 72c extends upward from the radially outer end of the radially extending portion 72b so as to surround the large diameter portion 71b.

The second antivibration rubber 73 has an inner diameter sized so as to allow the small diameter portion 71a to be inserted thereinto, and has an outer diameter sized so as to be in contact with the lower surface of the attachment stay 12.

The second attachment cover 74 has a radially extending portion 74a and a peripheral wall portion 74b. The radially extending portion 74a is brought into contact with the lower surface of the small diameter portion 71a of the first antivibration rubber 71 as well as the lower surface of the second antivibration rubber 73. The peripheral wall portion 74b extends upward from the outer periphery of the radially extending portion 74a so as to surround the second antivibration rubber 73.

The fastening bolt 75 has a head portion 75a and a shaft portion 75b. The head portion 75a is located above the upper surface of the support surface portion 813a of the coupling member 813. The shaft portion 75b extends downward from the head portion 75a to a position below the second attachment cover 74. The shaft portion 75b allows a nut 76 to be fastened therearound.

The antivibration mechanism 7 configured as described above improves the efficiency of assembling the cabin 8 to the attachment stay 12.

More specifically, firstly, the small diameter cylindrical portion 72a of the first attachment cover 72 is inserted from above into the attachment hole 12a of the attachment stay 12, and the small diameter portion 71a of the first antivibration rubber 71 is inserted from above into the small diameter cylindrical portion 72a. Thereafter, the cabin 8 is mounted on the upper surface of the large diameter portion 71b of the first antivibration rubber 71. In this state, the cabin 8 is mounted in a vibration-isolation manner on the attachment stay 12 with the first antivibration rubber 71 being interposed therebetween.

The fastening bolt 75 is then inserted into the small diameter portion 71a from above the support surface portion 813a of the coupling member 813.

Thereafter, the second antivibration rubber 73 is externally attached from below to the small diameter portion 71a of the first antivibration rubber 71, and the second attachment cover 74 is externally attached from below to the second antivibration rubber 73. In this state, the nut 76 is fastened around the shaft portion 75b.

As shown in FIG. 7, in the present embodiment, the oil tank 17 has the shape concaved at a region facing the corresponding attachment stay 12 in a plan view.

Figure 16:
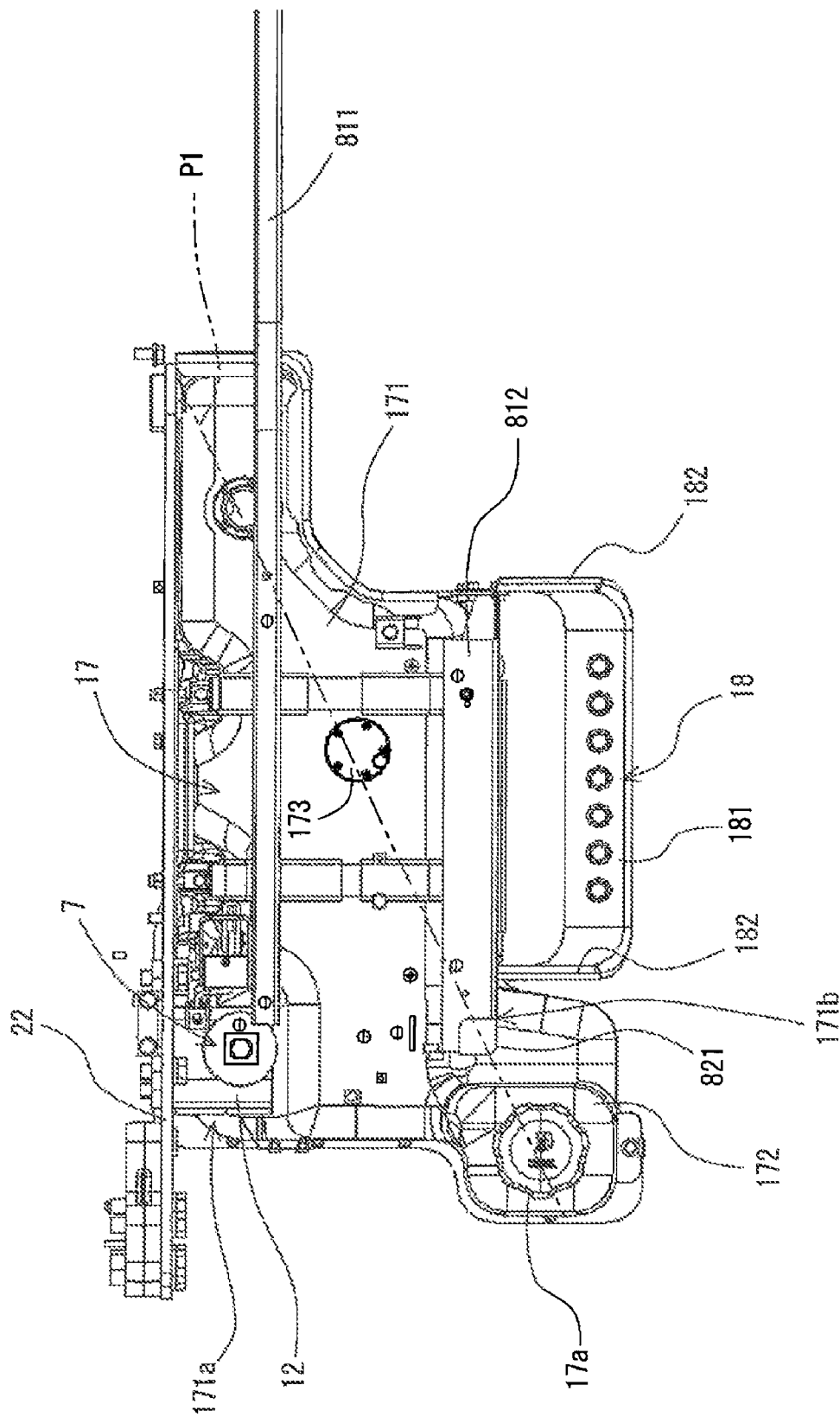
FIG. 16 is a plan view of the oil tank and the vicinity thereof in the internal structure of the working vehicle 1 shown in FIG. 3.

FIG. 16 is a plan view of the oil tank 17 and the vicinity thereof in the internal structure of the working vehicle 1 shown in FIG. 3. It is noted that the coupling member 813 is not illustrated in FIG. 16.

The oil tank 17 is preferably formed by blow molding, in which case, as shown in FIG. 16, it is more difficult to shape the oil tank 17 so as to have sharp corners as departing from a virtual vertical plane P1 that connects the oil supply port 17a and a portion most distant from the oil supply port 17a.

The present embodiment positively utilizes this difficulty so as to increase as much as possible the size of the oil tank 17 while preventing the oil tank 17 from being in contact with the corresponding attachment stay 12.

More specifically, as shown in FIG. 16, the main body portion 171 of the oil tank 17 has a length in the vehicle longitudinal direction larger than that in the vehicle width direction, and a corner 171a at the front and the inner side in the vehicle width direction is located immediately below the attachment stay 12.

The extending portion 172 provided with the oil supply port 17a extends forward and outward in the vehicle width direction from a corner 171b of the main body portion 171 that is located at the front and the outer side in the vehicle width direction.

In the oil tank 17 configured as described above, the region immediately below the attachment stay (the corner 171a), which is located below the attachment stay 12, can be spaced apart from the virtual vertical plane. Accordingly, the oil tank 17 is shaped by blow molding so as to be smooth with no sharp corner in the region immediately below the attachment stay.

As a result, the oil tank 17 can be formed by ordinary blow molding, while effectively preventing the region immediately below the attachment stay from being brought into contact with the attachment stay 12.

As shown in FIGS. 7, 11, and 14, in the present embodiment, each of the coupling members 813 is further provided with a rear surface portion 813c that is located behind the site of the support surface portion 813a at which the antivibration mechanism 7 is supported and is bent upward from the rear end of the horizontal portion 813a. The rear surface portion 813c has an upper end that is brought into contact with corresponding one of the floor members 851. This configuration allows the floor members 851 to be stably supported.

In the present embodiment, the rear surface portion 813c has one of right and left ends that is brought into contact with one of the side surfaces of the lower inner side frame 811 and the lower outer side frame 812, and the other one of the right and left ends to be spaced apart from the other one of the side surfaces of the lower inner side frame 811 and the lower outer side frame 812.

In the present embodiment, as shown in FIGS. 11 and 14, the rear surface portion 813c is located so as to have the right end that is brought into contact with the side surface of the lower inner side frame 811 and the left end that is spaced apart from the side surface of the lower outer side frame 812.

In the present embodiment, the rear opening 19b is therefore configured by the lower surface of the floor member 851, the other one of the side surfaces of the lower inner side frame 811 and the lower outer side frame 812, the upper surface of the support surface portion 813a, and the other one of the right and left ends of the rear surface portion 813c.

The bag portion 19 can be provided inside thereof with a buffer member that is made of hard rubber sponge or the like and has an opening so as to allow the hose and/or the wire to be inserted therethrough.

This configuration can prevent the hose and/or the wire from being damaged due to the sliding contact with the lower outer side frame 812 or the lower inner side frame 811.

The buffer member is preferably provided in the bag portion 19 so as to cover a member (such as an attachment bolt or a rivet) that is used for attaching the antivibration mechanism 7 to the horizontal portion 813a of the coupling member 813.

The above configuration can prevent the attachment member for the antivibration mechanism 7 from being unintentionally loosened and also prevent the hose and/or the wire from being damaged due to the sliding contact with the attachment member.

In the present embodiment, the cabin 8 is further configured as described below.

As shown in FIGS. 3 to 5, the lower frame portion 81 further includes a pair of lower outer side rear frames 814 that have front ends coupled to the rear ends of the pair of lower outer side frames 812, respectively, and extend rearward in the vehicle longitudinal direction.

The lower outer side rear frames 814 are positioned upward as they go from the front ends toward the rear ends, respectively.

As shown in FIGS. 3 to 5, the vertical frame portion 82 further includes a pair of vertical rear frames 822, in addition to the vertical front frames 821. The pair of vertical rear frames 822 have upper ends coupled to portions of the upper frame portion 83 that are close to the rear end thereof, and lower ends coupled to the rear ends of the lower outer side rear frames 814, respectively.

The vertical frame portion 82 further includes a pair of vertical intermediate frames 823 that are provided such as to stand from intermediate sites of the pair of lower outer side rear frames 814, respectively.

As shown in FIGS. 3 to 5, the cabin 8 has a horizontal rear frame 87 and a pair of vertical rear lower frames 88. The horizontal rear frame 87 couples portions of the pair of vertical rear frames 822 that are close to the lower ends thereof. The pair of vertical rear lower frames 88 have upper ends coupled to portions of the horizontal rear frame 87 that are close to the outer ends thereof and lower ends extending downward, respectively.

Figure 17:
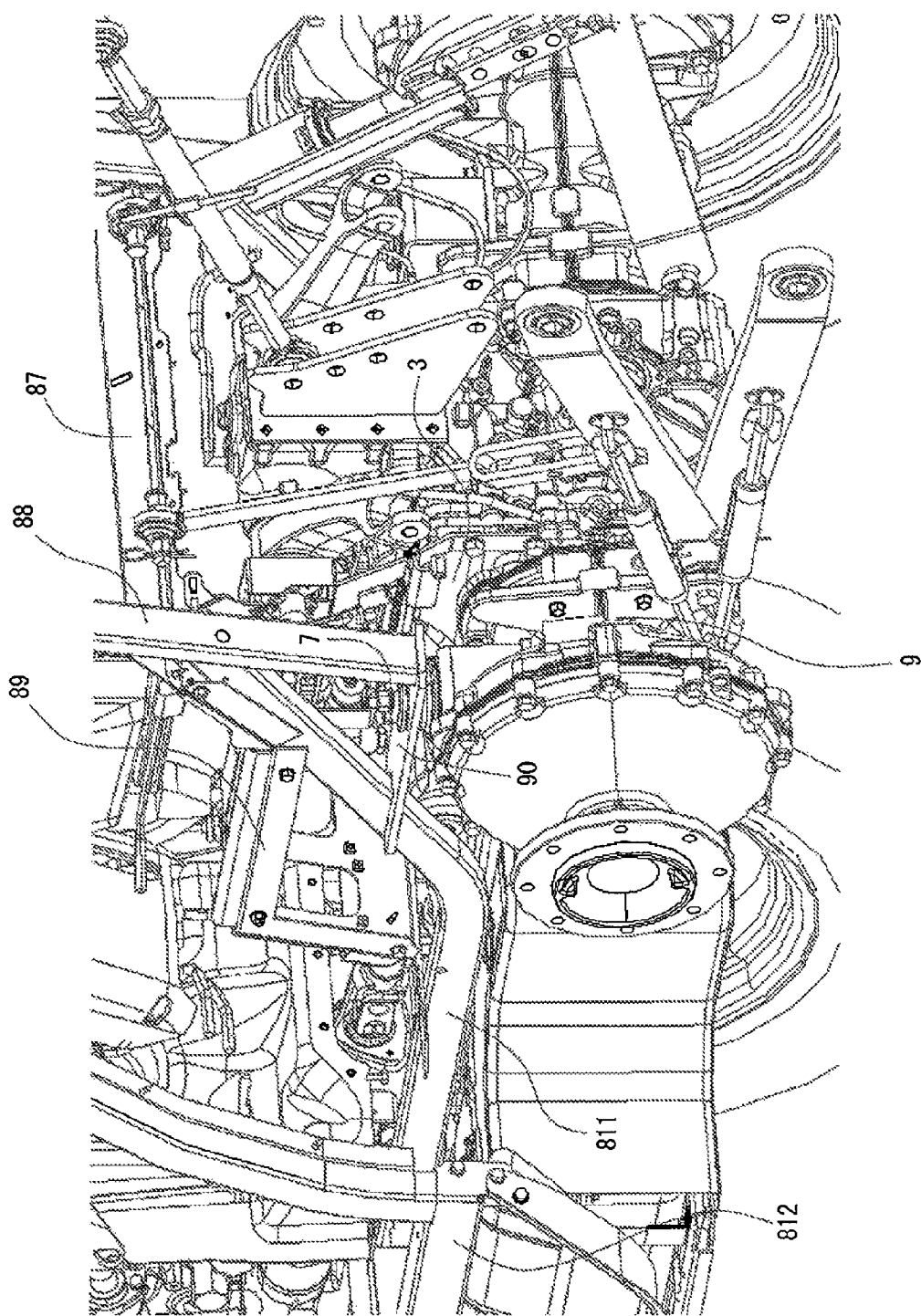
FIG. 17 is a perspective view, as viewed from behind, of a rear axle case and the vicinity thereof in the internal structure of the working vehicle shown in FIG. 3.

FIG. 17 is a perspective view, as viewed from behind, of one of the rear axle cases 9 and the vicinity thereof in the internal structure of the working vehicle 1 shown in FIG. 3.

As shown in FIGS. 3 to 5 and 17, rear ends of the pair of lower inner side frames 811 are coupled to the pair of vertical rear lower frames 88, respectively.

More specifically, the pair of lower inner side frames 811 have rear regions that extend rearward from the rear ends of the lower outer side frames 812, respectively.

The rear regions are inclined so as to be positioned upward as they go from the front to the rear, and the rear ends are coupled to the pair of vertical rear lower frames 88, respectively.

As shown in FIGS. 4 and 5, the upper frame portion 83 has a front roof frame 831, a pair of side roof frames 832, and a rear roof frame 833. The front roof frame 831 couples the upper ends of the pair of vertical front frames 821. The pair of side roof frames 832 couple the upper ends of one of the pair of vertical front frames 821 and one of the pair of vertical rear frames 822 that is positioned on the same side as the one vertical front frames 821 in the vehicle width direction. The rear roof frame 833 couples the upper ends of the pair of vertical rear frames 822. As shown in FIG. 3, the outer roof 84 is attached onto the front roof frame 831, the pair of side roof frames 832, and the rear roof frame 833.

In the present embodiment, each of the frames configuring the cabin 8 is formed as a hollow pipe or into a U-letter shape in cross section. More specifically, as shown in FIGS. 11 and 14, in the present embodiment, the lower inner side frames 811 are formed as the hollow pipes and the lower outer side frames 812 and the lower outer side rear frames 814 are each formed into the U-letter shape in cross section.

Alternatively, these frames may be each made of a structural member in an L-letter shape or an H-letter shape in cross section.

As shown in FIGS. 3 to 5 and 17, in the present embodiment, the cabin 8 has a driver's seat mount plate 89 on which a driver's seat 80 is mounted. The driver's seat mount plate 89 is supported by the pair of lower inner side frames 811 and the pair of vertical rear lower frames 88.

The cabin 8 further includes a pair of rear mount plates 90 that are respectively supported by the pair of lower inner side frames 811 and the pair of vertical rear lower frames 88 so as to be aligned substantially in the horizontal direction. The pair of rear mount plates 90 are each supported by the transmission case 3 or corresponding one of the rear axle cases 9 with the corresponding antivibration mechanism 7 being interposed therebetween. In the present embodiment, the pair of rear mount plates 90 are supported by the rear axle cases 9, respectively.

As shown in FIGS. 3 to 5, in the present embodiment, the air separator plate 86 has the lower end welded to the floor members 851 and the upper portion welded to a pair of horizontal front frames 91 that are coupled to the pair of vertical front frames 821, respectively.

As shown in FIGS. 6, 7, 14, 19, and the like, in the present embodiment, the lower inner side frames 811 and the lower outer side frames 812 are overlapped with the vehicle frames 2, respectively, with respect to the vertical direction in a side view.

More specifically, each of the lower inner side frames 811 and each of the lower outer side frames 812 have a lower surface 811a and a lower surface 812a, respectively, in the regions where floor portion 85 is arranged. The lower surfaces 811a and 812a are located below the upper surface 22a of the corresponding main frame 22. Further, each of the lower inner side frames 811 and each of the lower outer side frames 812 have an upper surface 811b and an upper surface 812b, respectively, in the regions where the floor portion 85 is arranged. The upper surfaces 811b and 812b are located above the upper surface of the corresponding main frame 22. The configuration described above allows the floor portion 85 to be located at a low position, which secures the sufficient height of the internal space of the cabin 8, with the height of the entire working vehicle 1 being kept small.

Figure 18:
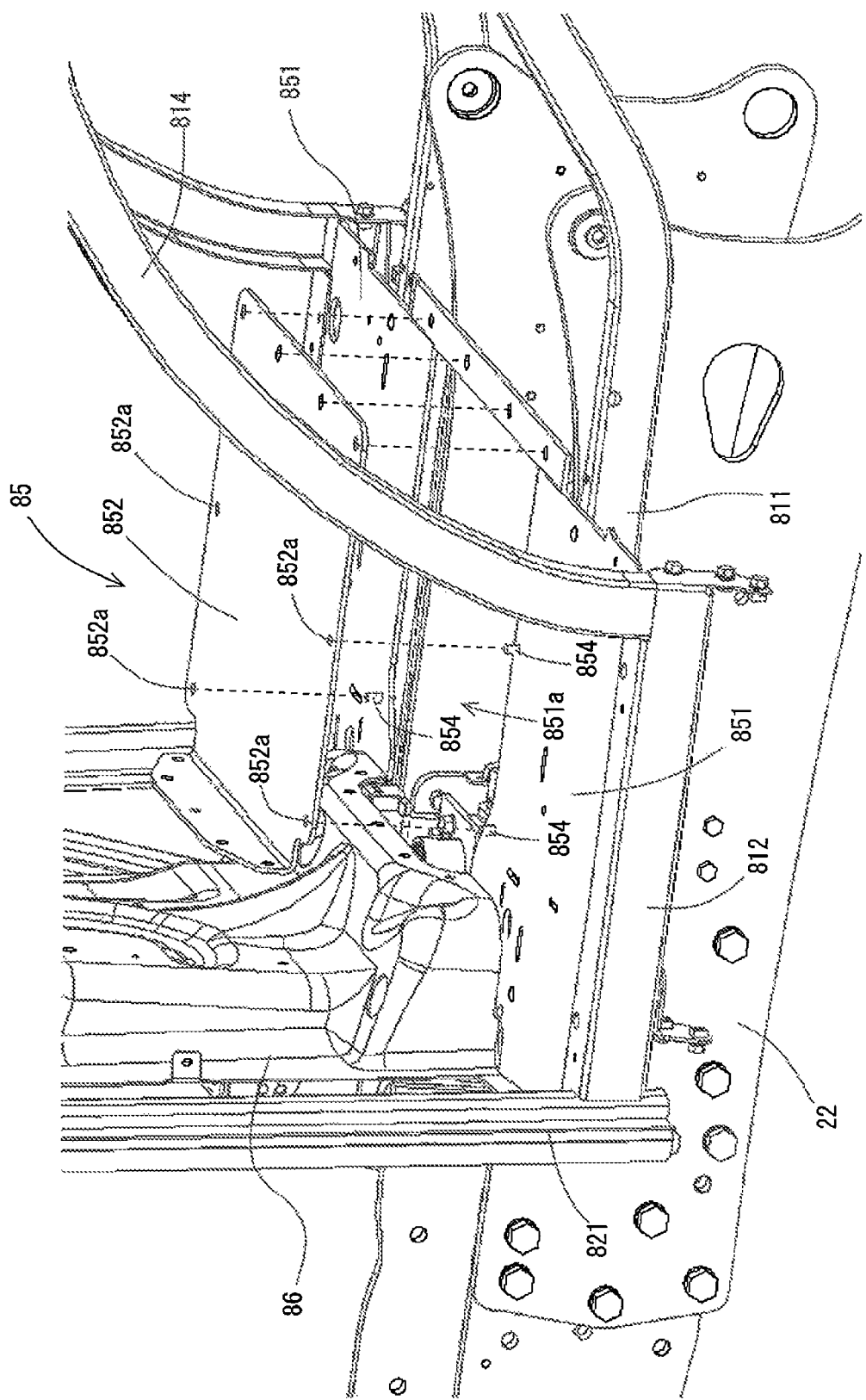
FIG. 18 is a partial assembly view of a floor portion in the working vehicle according to the embodiment.

FIG. 18 is a partial assembly view of the floor portion 85 in the working vehicle 1 according to the present embodiment.

As shown in FIG. 18, provided in the present embodiment are the pair of right and left floor members 851 that have the outer ends in the vehicle width direction being located above the lower outer side frames 812, and the inner ends in the vehicle width direction being located inside the lower inner side frames 811 in the vehicle width direction, respectively.

More specifically, the floor members 851 are arranged to form an opening 851a between the pair of main frames 22 in the vehicle width direction.

The floor portion 85 includes a central cover 852 that closes the opening 851a. The central cover 852 is detachably fixed to the air separator plate 86 as well as to the pair of right and left floor members 851.

The configuration described above facilitates the work of assembling the various components to be disposed between the main frames 22 and the maintenance thereof.

The opening 851a preferably has a width of at least one third of the distance between the main frames 22 in the vehicle width direction.

Figure 19:
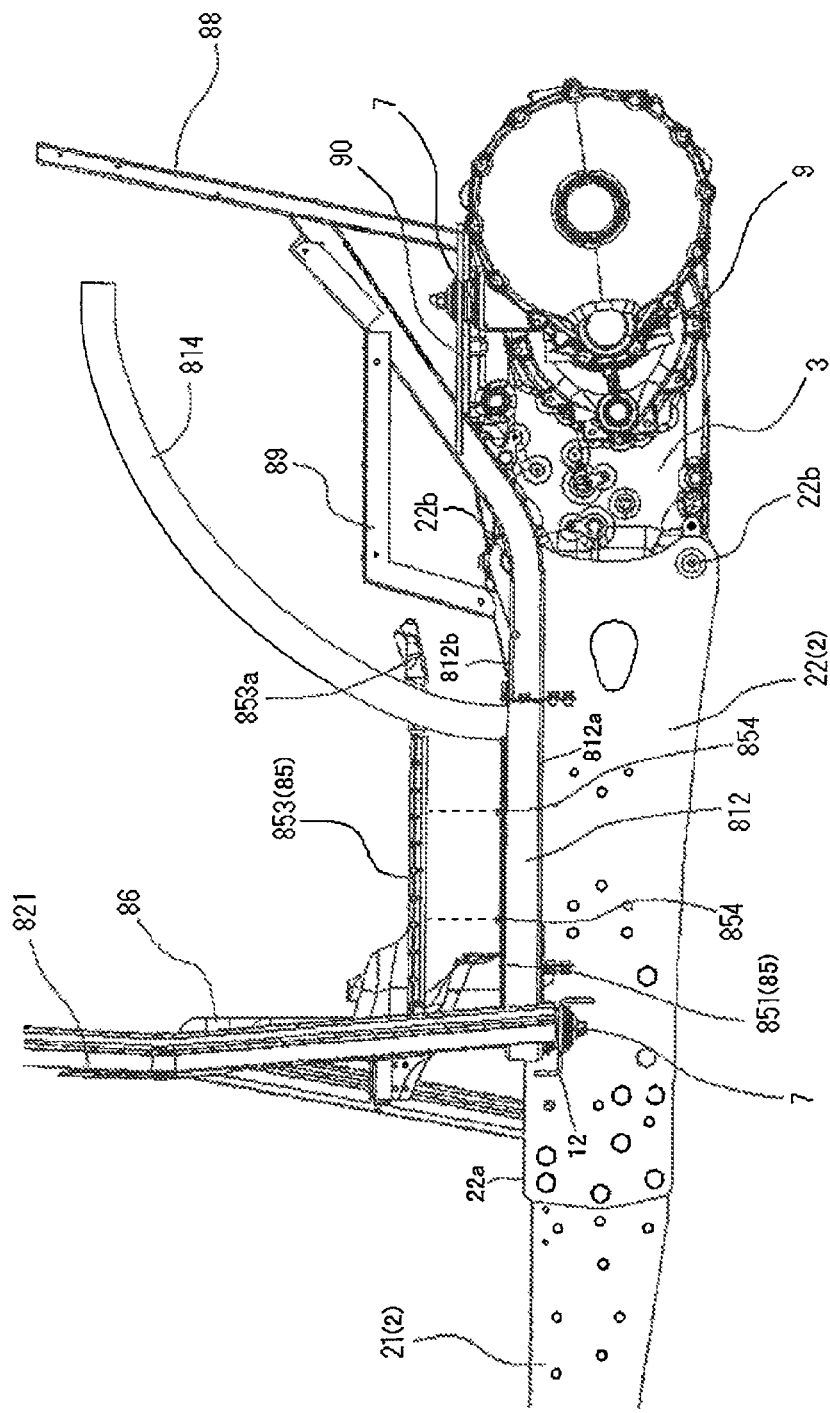
FIG. 19 is a side view of the rear end and the vicinity of the main frame in the frame structure of the working vehicle according to the embodiment.

FIG. 19 is a side view of the rear end and the vicinity of the main frame 22 in the frame structure of the working vehicle 1 according to the present embodiment.

As shown in FIG. 19, in the present embodiment, each of the main frames 22 has a coupling portion 22b that is coupled to the transmission case 3 and is larger in width in the vertical direction as compared to the other portions.

In the above configuration, the main frame 22 can be strengthened at the portion required to be strong enough for the coupling with the transmission case 3, without increasing the thickness of the main frame 22. As a result, the vehicle frame 2 can secure enough strength with the weight as low as possible.

In the present embodiment, the main frame 22 has the largest width in the vertical direction, as compared to the other portions, at the rear end serving as the coupling portion 22b with the transmission case 3. The widest rear end of the main frame 22 has the upper end that is located above the corresponding floor member 851.

Further, the floor members 851 and/or the driver's seat mount plate 89 has the portions corresponding to the coupling portions 22b of the main frames 22 with respect to the vehicle longitudinal direction, and these portions are located above the upper surfaces of the lower outer side frames 812.

The above configuration secures the gaps between the main frames 22 and the floor members 851 and/or between the main frames 22 and the driver's seat mount plate 89. Therefore, effectively prevented is the contact between the cabin 8 and the vehicle frames 2 in cases where the cabin 8 is vibrated.

As shown in FIG. 19, in the present embodiment, the floor portion 85 is provided with a floor mat 853 that is laid over the floor members 851 and the central cover 852 so as to cover these members.

The floor mat 853 has an upper surface that is flat and a lower surface that is provided at the rear end with an inclined portion inclined along the portions corresponding to the coupling portions 22b of the main frames 22.

This configuration increases as much as possible a flat area on the upper surface of the floor portion 85, thereby enhancing the interior comfort.

Figure 20:
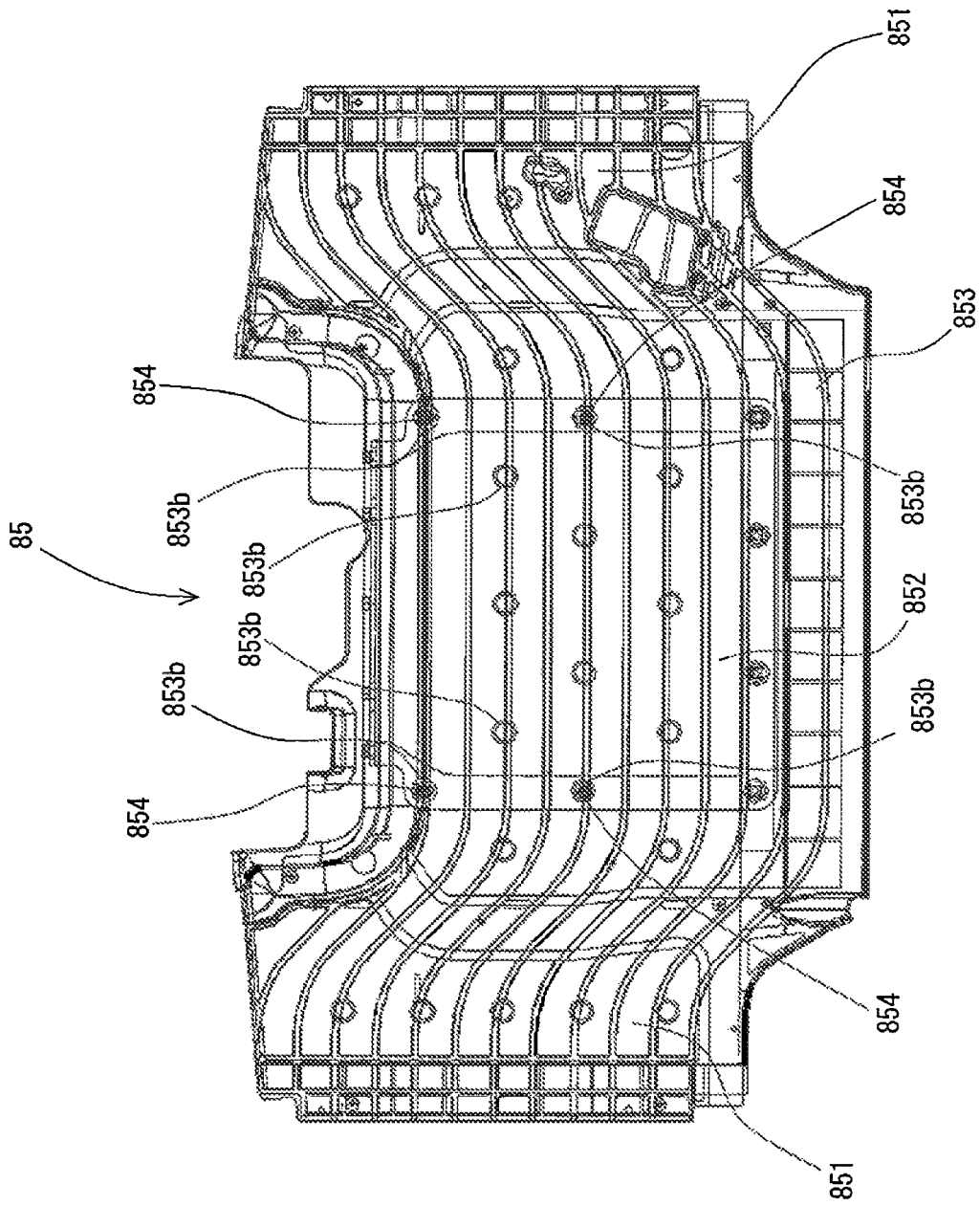
FIG. 20 is a transparent plan view of the floor portion in the frame structure shown in FIG. 19.
Figure 21:
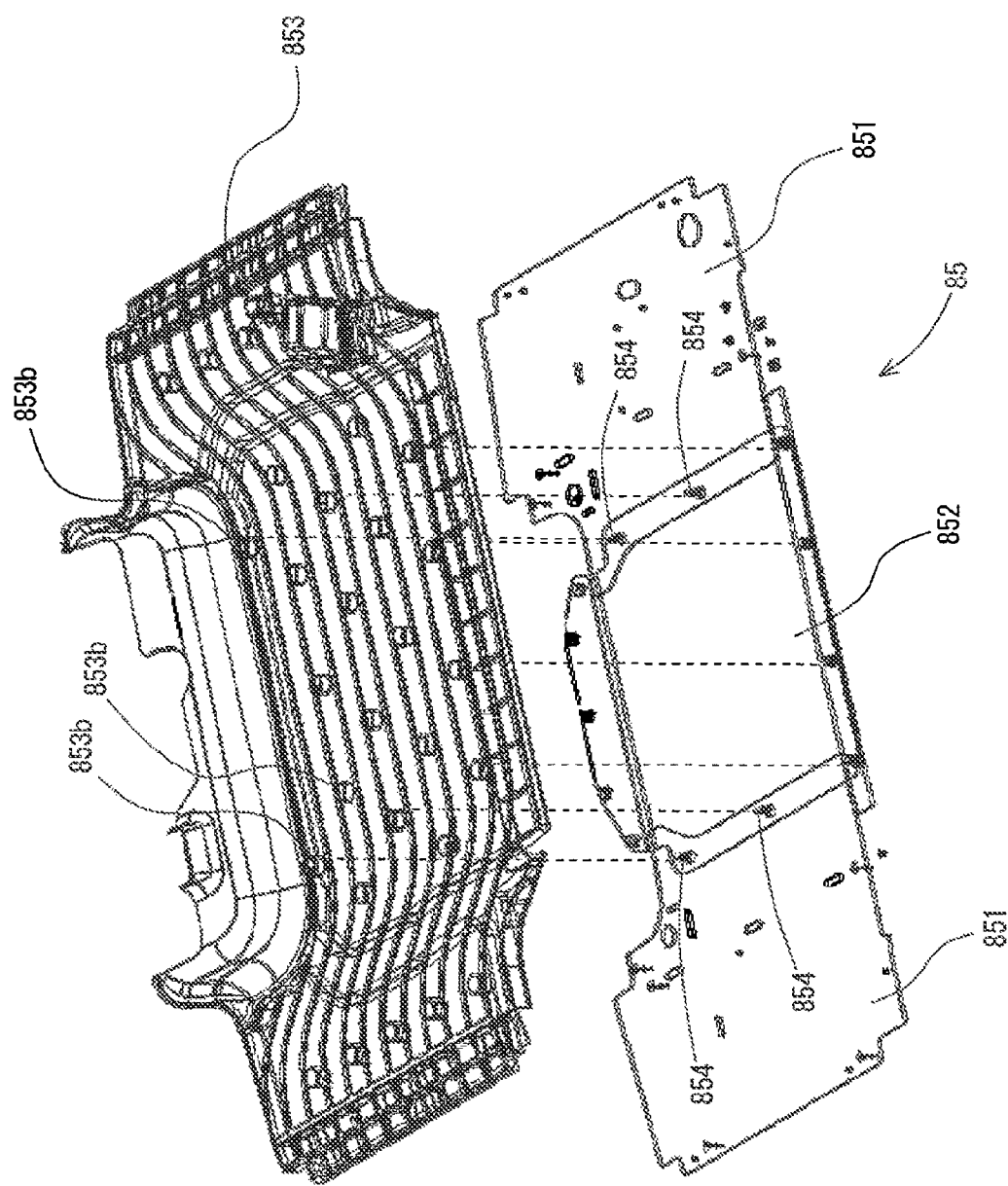
FIG. 21 is a perspective assembly view of the floor portion in the frame structure shown in FIG. 19.

FIG. 20 and FIG. 21 are a transparent plan view and a perspective assembling view of the floor portion 85 in the frame structure shown in FIG. 19.

As shown in FIGS. 18 to 21, in the present embodiment, the central cover 852 has through holes 852a into which fixing members 854 (such as fastening bolts) that project from the upper surfaces of the pair of floor members 851 are engaged. The central cover 852 is locked such that the fixing members 854 project upward from the upper surface of the central cover 852.

As shown in FIGS. 19 to 21, the floor mat 853 is provided on the lower surface with a plurality of ribs 853b that surround the fixing members 854 projecting upward from the upper surface of the central cover 852.

In the above configuration, the floor mat 853 can be easily fixed with no use of any other component such as a clip. A reduction in cost as well as an improvement in assembling performance is achieved in comparison to a conventional configuration in which the floor mat 853 is fixed with use of such a clip.

Moreover, the floor mat 853 can be easily removed by being lifted up, which also enhances the performance in the maintenance such as cleaning in comparison to the conventional configuration using such a clip.

In the present embodiment, the plurality of ribs 853b provided on the floor mat 853 have a cylindrical shape. However, the shape of the ribs 853b is not limited to the above configuration, and can be variously formed such as into a rectangular shape in cross section, as long as the fixing members 854 can restrict the horizontal shift of the floor mat 853.

Further, in the present embodiment, the plurality of ribs 853b are provided also in the portions other than the positions corresponding to the fixing members 854 on the central cover 852.

This configuration prevents the floor mat 853 from being unleveled, as well as provides a gap (an air space) between the floor mat 853 and the floor surface formed by the floor members 851 and the central cover 852, thereby reducing the transmission of the vibration from the floor surface.

There can be further provided, in the gap, a sound absorber such as urethane foam.

In the case of attaching the sound absorber, the sound absorber is preferably provided with small holes having a diameter substantially the same as or smaller than that of the ribs 853b on the floor mat 853, so that the ribs 853b are fitted and fixed in the holes, respectively.

In the above configuration, the sound absorber can be easily attached to the floor mat 853 as well as can be easily detached therefrom. This improves the workability of the maintenance such as cleaning of the floor mat 853 and also reduces the maintenance cost because only the floor mat 853 can be replaced.

The embodiment of the present invention has been described as above. However, the present invention is not to be limited to the above embodiment, but can be improved, modified, and corrected in various ways as long as not departing from the spirit of the present invention.

DESCRIPTION OF THE REFERENCE NUMERALS 1 working vehicle
3 transmission case 4 engine
7 antivibration mechanism
8 cabin
9 rear axle case
10 front axle case
11 reinforcing member
12 attachment stay
14 engine mounting flange
15 antivibration mechanism.
16 bridge frame
16a side plate portion
16b coupling plate portion
21 front frame
22 main frame
25 spacer
51 front wheel
52 rear wheel
53 front axle
54 rear axle
81 lower frame portion
82 vertical frame portion
83 upper frame portion
84 outer roof
85 floor portion
86 air separator plate
86a bulging portion
111 brake operation shaft
112 first brake boss
113 second brake boss
114 first brake pedal
115 second brake pedal
116 brake vertical link
117 brake horizontal link
118 brake intermediate shaft
119 brake intermediate boss
811 lower inner side frame
812 lower outer side frame
813 coupling member

The invention claimed is:

1. A working vehicle with cabin configured so that rotational power from an engine is changed in speed by a transmission including a transmission case and then is transmitted to a pair of front wheels and/or a pair of rear wheels, which function as driving wheels,
wherein the transmission case having right and left side walls to which a pair of rear axle cases are coupled is disposed rearward at a distance from the engine, the pair of rear axle cases accommodating a pair of rear axles that are coupled to the pair of rear wheels,
wherein there are provided a pair of right and left front frames that are disposed on a front side of the vehicle and support a front axle case accommodating a front axle coupled the front wheels,
wherein there are provided a pair of right and left main frames that couple the pair of front frames with the right and left side walls of the transmission case, respectively,
wherein there are provided a reinforcing member and a pair of attachment stays, the reinforcing member coupling the pair of main frames with each other in a state of being overlapped with the pair of main frames in a side view, the pair of attachment stays being fixedly attached to the outer side surfaces of the pair of main frames so as to be at least partially overlapped with the reinforcing member in a side view, and
wherein the cabin is supported in a vibration-isolation manner at no less than four positions including the pair of attachment stays, and right and left supporting positions that are provided at the pair of rear axle cases or the transmission case.

2. A working vehicle with cabin according to claim 1, further comprising a bridge frame including a pair of side plate portions and a coupling plate portion, the pair of side plate portions having lower ends coupled to the right and left ends of the reinforcing member and upper ends extending upward, the coupling plate portion coupling the upper ends of the pair of side plate portions with each other and being connected via an antivibration mechanism to an engine mounting flange provided at the rear end surface of the engine.

3. A working vehicle with cabin according to claim 2,
wherein the pair of main frames are disposed outward from the pair of front frames in the vehicle width direction, and the front ends of the main frames are directly or indirectly coupled with the rear ends of the pair of front frames in a state of being overlapped therewith in a side view, and
wherein the engine has a front portion supported in a vibration-isolation manner by the pair of front frames and a rear portion supported in a vibration-isolation manner by the bridge frame, in the state where the engine extends in the vehicle longitudinal direction so as to be across the overlapped regions where the pair of front frames and the pair of main frames are overlapped with each other.

4. A working vehicle with cabin according to claim 3, wherein the front ends of the pair of main frames are coupled to the rear ends of the pair of front frames with spacers being interposed therebetween, respectively.

5. A working vehicle according to claim 1,
wherein the cabin includes a lower frame portion, a vertical frame portion that is supported by the lower frame portion so as to stand upward, an upper frame portion that is supported by the upper end of the vertical frame portion, an outer roof that is placed on the upper frame portion, a floor portion that is supported by the lower frame portion, and an air separator plate that separates the cabin from an engine/flywheel unit that is disposed in front of the cabin,
wherein the lower frame portion includes a pair of lower inner side frames, a pair of lower outer side frames and a pair of coupling members, the pair of lower inner side frames being aligned in the vehicle longitudinal direction in a state of being disposed outward from the pair of main frames in the vehicle width direction such that gaps are formed between the pair of lower inner side frames and the pair of main frames, respectively, and also in a state of having upper surfaces located above the upper surfaces of the main frames, the pair of lower outer side frames being aligned in the vehicle longitudinal direction in a state of being disposed outward from the pair of lower inner side frames in the vehicle width direction and also in a state of having upper surfaces located at positions substantially identical with the upper surfaces of the lower inner side frames, respectively, each of the pair of coupling members coupling the corresponding lower inner side frame and the lower outer side frame and being supported by the attachment stay with an antivibration mechanism being interposed therebetween,
wherein the floor portion includes floor members that are placed directly or indirectly on the upper surfaces of the pair of lower inner side frames and the pair of lower outer side frames, wherein the working vehicle further includes a brake operation shaft, a first brake boss, a second brake boss, first and second brake pedals, a pair of right and left brake vertical links, and a pair of right and left brake horizontal links, the brake operation shaft being directly or indirectly supported by the air separator plate in a state of being aligned in the vehicle width direction and located closer to the inside of the cabin than the air separator plate, the first brake boss being supported by the brake operation shaft in relatively rotatable manner with respect thereto, the second brake boss being supported by the brake operation shaft in a relatively non-rotatable mariner with respect thereto, the first and second brake pedals being coupled to the first and second brake bosses, respectively, the pair of brake vertical links being shifted substantially in the vertical direction in response to driver's operations to the first and second brake pedals, respectively, the pair of brake horizontal links operatively connecting the pair of brake vertical links with a pair of right and left brake mechanisms provided to the transmission, respectively, and being shifted substantially in the forward/backward direction in response to the shifts of the pair of brake vertical links in the vertical direction, wherein the air separator plate is provided with a pair of right and left bulging portions that bulge toward the inside of the cabin, the bulging portions being located outward from the pair of main frames in the vehicle width direction and below the brake operation shaft in the vertical direction, wherein the lower ends of the pair of right and left brake vertical links extend downward from the inside of the cabin through the pair of right and left bulging portions, respectively, and wherein the lower ends of the pair of right and left brake vertical links are coupled with the front ends of the pair of right and left brake horizontal links, with a pair of right and left brake intermediate bosses being interposed therebetween, respectively, the brake intermediate bosses being supported respectively by a pair of right and left brake intermediate shafts in a relatively rotatable manner with respect thereto, the brake intermediate shaft being arranged in the gaps between the pair of main frames and the pair of lower inner side frames, respectively, so as to be located below the floor members as well as behind the attachment stays.

* * * * *